US010042079B2

(12) United States Patent
Patnaik

(10) Patent No.: US 10,042,079 B2
(45) Date of Patent: Aug. 7, 2018

(54) IMAGE-BASED OBJECT DETECTION AND FEATURE EXTRACTION FROM A RECONSTRUCTED CHARGED PARTICLE IMAGE OF A VOLUME OF INTEREST

(71) Applicant: Decision Sciences International Corporation, Poway, CA (US)

(72) Inventor: Rohit Patnaik, Carlsbad, CA (US)

(73) Assignee: Decision Sciences International Corporation, Poway, CA (US)

( * ) Notice: Subject to any disclaimer, the term of this patent is extended or adjusted under 35 U.S.C. 154(b) by 125 days.

(21) Appl. No.: 14/706,825

(22) Filed: May 7, 2015

(65) Prior Publication Data

US 2015/0325013 A1    Nov. 12, 2015

Related U.S. Application Data

(60) Provisional application No. 61/990,074, filed on May 7, 2014, provisional application No. 62/076,044, filed on Nov. 6, 2014.

(51) Int. Cl.
*G01V 5/00* (2006.01)
*G06T 11/00* (2006.01)
(Continued)

(52) U.S. Cl.
CPC ............ *G01V 5/0016* (2013.01); *G06T 7/11* (2017.01); *G06T 7/136* (2017.01); *G06T 7/155* (2017.01);
(Continued)

(58) Field of Classification Search
None
See application file for complete search history.

(56) References Cited

U.S. PATENT DOCUMENTS 8,247,767 B2   8/2012 Morris et al.
2002/0015517 A1   2/2002 Hwang et al.
(Continued)

FOREIGN PATENT DOCUMENTS

WO    2016/057532 A1    4/2016

OTHER PUBLICATIONS

Pesente, Silvia, et al. "First results on material identification and imaging with a large-volume muon tomography prototype." Nuclear Instruments and Methods in Physics Research Section A: Accelerators, Spectrometers, Detectors and Associated Equipment 604.3 (2009): 738-746.*
(Continued)

*Primary Examiner* — Zhengxi Liu
(74) *Attorney, Agent, or Firm* — Perkins Coie LLP

(57) ABSTRACT

Techniques, systems, and devices are disclosed for analyzing a reconstructed charged particle image of a volume of interest from charged particle detector measurements to detect objects within the volume of interest and then extracting features from the detected objects based on their statistical and geometric properties. In one aspect, this technique partitions the reconstructed charged particle image of the volume into a set of voxels, wherein each voxel is associated with an intensity value. The technique next performs a segmentation operation on the said image to identify a subset of the set of voxels as object-candidate voxels for generating objects. The technique then performs a connected-component analysis on the object-candidate voxels to identify one or more objects within the said image of the volume. The technique subsequently extracts a set of object features from each identified object based at least on the statistical and geometric properties of the identified object.

45 Claims, 22 Drawing Sheets

(51) Int. Cl.
*G06T 7/11* (2017.01)
*G06T 7/155* (2017.01)
*G06T 7/187* (2017.01)
*G06T 7/136* (2017.01)

(52) U.S. Cl.
CPC ............ *G06T 7/187* (2017.01); *G06T 11/005* (2013.01); *G06T 11/008* (2013.01)

(56) References Cited

U.S. PATENT DOCUMENTS

| | | |
|---|---|---|
| 2004/0252870 A1* | 12/2004 | Reeves ................. G06T 7/0012 382/128 |
| 2006/0209063 A1* | 9/2006 | Liang ..................... G06K 9/342 345/419 |
| 2006/0233302 A1 | 10/2006 | Might et al. |
| 2007/0047840 A1* | 3/2007 | Xu ........................ G06K 9/3216 382/294 |
| 2008/0228418 A1 | 9/2008 | Green |
| 2008/0315091 A1 | 12/2008 | Morris et al. |
| 2009/0116766 A1 | 5/2009 | Matsumoto et al. |
| 2009/0226060 A1 | 9/2009 | Gering et al. |
| 2009/0295576 A1 | 12/2009 | Shpantzer et al. |
| 2010/0040192 A1 | 2/2010 | Zhang et al. |
| 2010/0046704 A1 | 2/2010 | Song et al. |
| 2010/0090097 A1 | 4/2010 | Koltick |
| 2011/0216945 A1 | 9/2011 | Jaenisch |
| 2011/0248163 A1 | 10/2011 | Morris et al. |
| 2012/0056995 A1 | 3/2012 | Dedeoglu et al. |
| 2013/0238291 A1 | 9/2013 | Schultz et al. |
| 2013/0294574 A1 | 11/2013 | Peschmann |
| 2014/0247987 A1 | 9/2014 | Nomoto |
| 2014/0254920 A1 | 9/2014 | Xu et al. |
| 2014/0294147 A1 | 10/2014 | Chen et al. |
| 2014/0319365 A1 | 10/2014 | Sossong et al. |
| 2014/0332685 A1* | 11/2014 | Anghel ................ G01N 23/046 250/307 |
| 2015/0212014 A1 | 7/2015 | Sossong et al. |
| 2015/0220814 A1 | 8/2015 | Verkasalo et al. |
| 2015/0241593 A1 | 8/2015 | Blanpied et al. |
| 2016/0041297 A1 | 2/2016 | Blanpied et al. |
| 2016/0061752 A1 | 3/2016 | Kumadi et al. |
| 2016/0104290 A1 | 4/2016 | Patnaik |

OTHER PUBLICATIONS

Steve Eddins, "Connected component labeling", May 11, 2007, retrieved from http://blogs.mathworks.com/steve/2007/05/11/connected-component-labeling-part-5/.*

Borozdin, Konstantin N., et al. "Surveillance: Radiographic imaging with cosmic-ray muons." Nature 422.6929 (2003): 277-277.*

International Search Report and Written Opinion dated Aug. 12, 2015 for International Application No. PCT/US2015/029769, filed on May 7, 2015 (8 pages).

International Search Report and Written Opinion dated Dec. 29, 2015 for International Application No. PCT/US2015/054266, filed on Oct. 6, 2015 (9 pages).

Patnaik, R., et al., "Image Based Object Identification in Muon Tomography," 2014 IEEE Nuclear Science Symposium and Medical Imaging Conference (NSS/MIC), 11 pages, Nov. 2014.

* cited by examiner

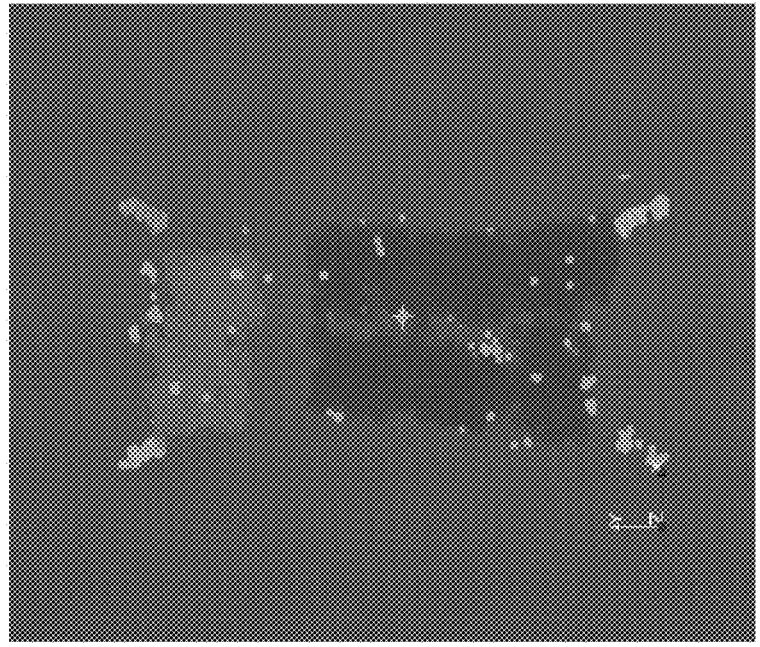
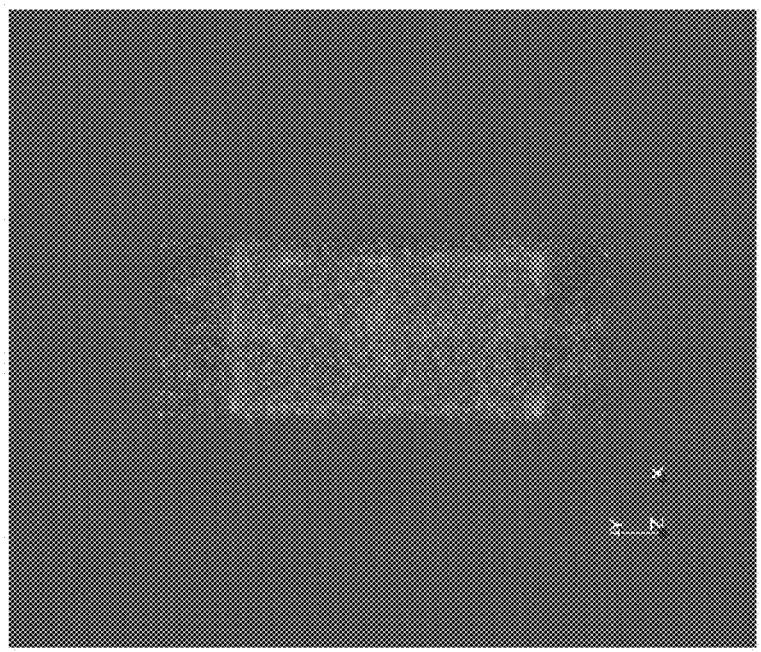
FIG. 3

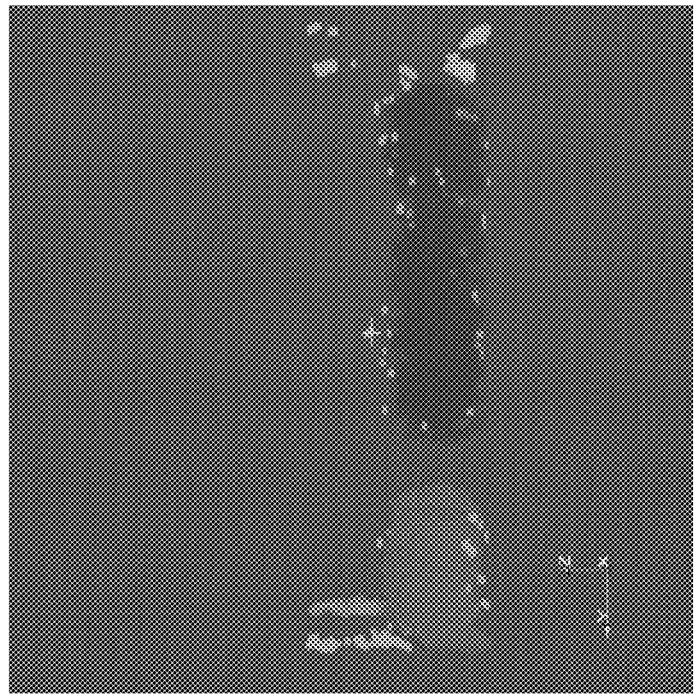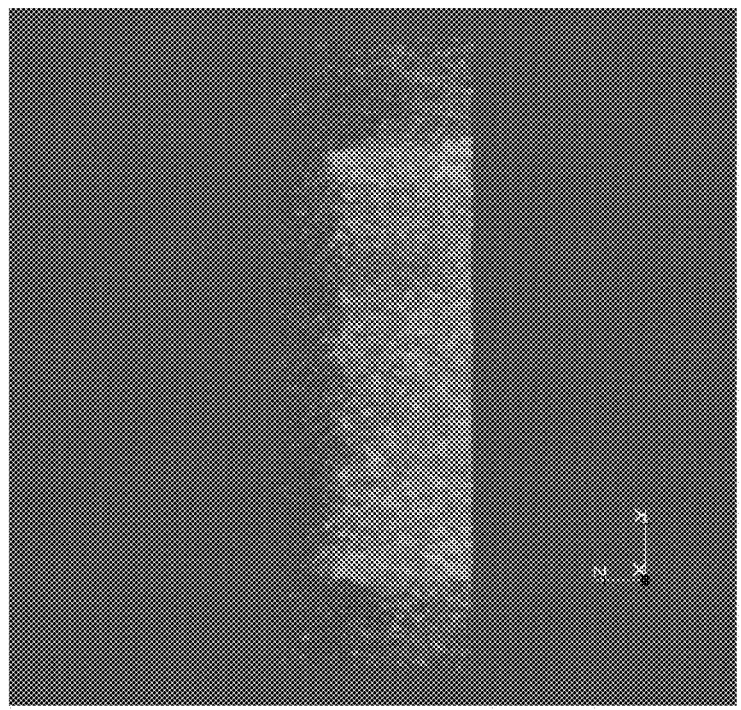
FIG. 4

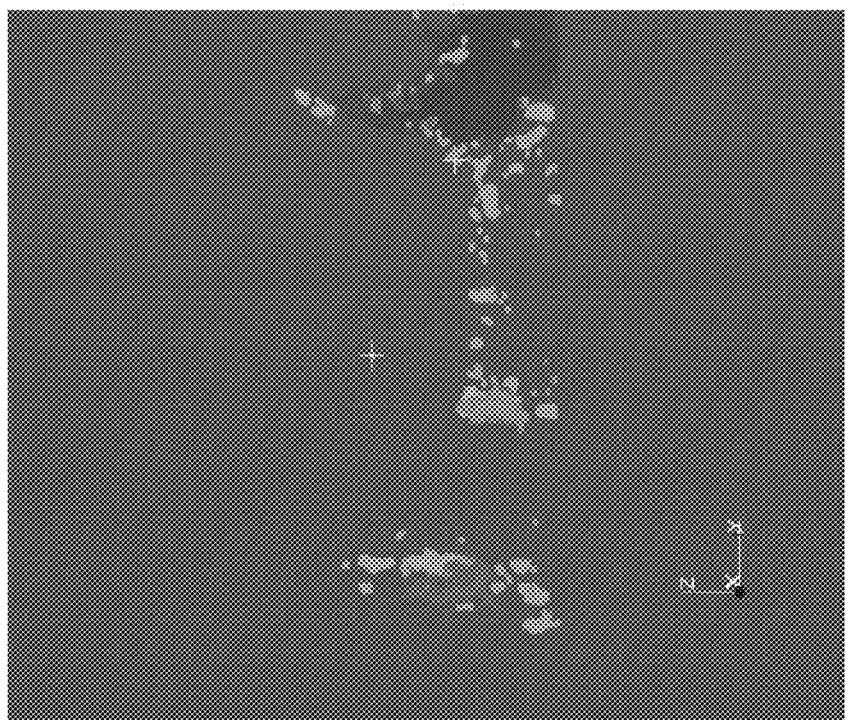
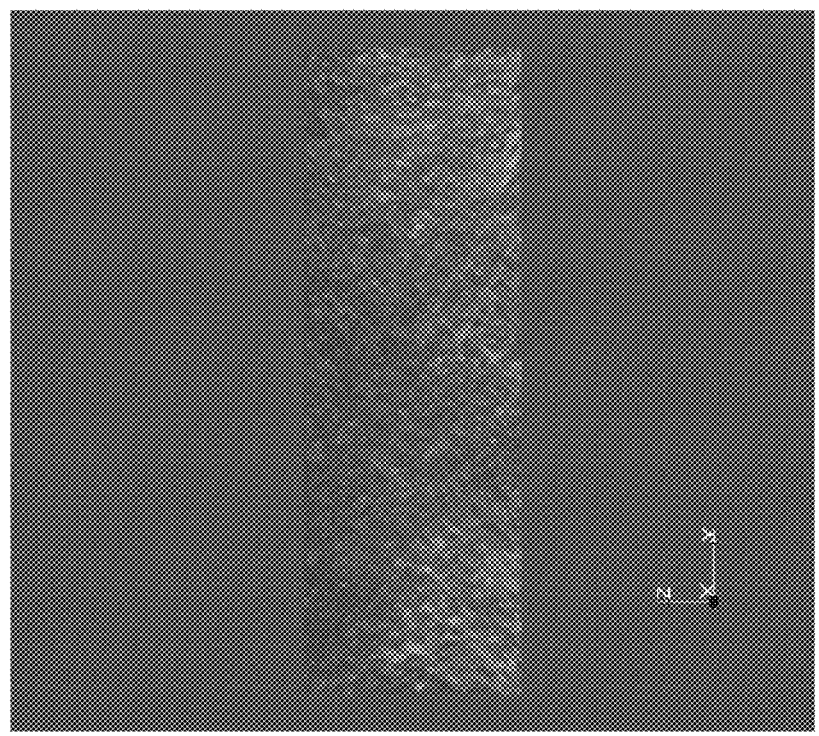
FIG. 5

IMAGE-BASED OBJECT DETECTION AND FEATURE EXTRACTION FROM A RECONSTRUCTED CHARGED PARTICLE IMAGE OF A VOLUME OF INTEREST

CROSS REFERENCE TO RELATED APPLICATIONS

This patent document claims the benefit of priority of U.S. Provisional Patent Application No. 61/990,074, filed on May 7, 2014, and U.S. Provisional Patent Application No. 62/076,044, filed on Nov. 6, 2014. The entire contents of the before-mentioned patent applications are incorporated by reference as part of the disclosure of this document.

TECHNICAL FIELD

The subject matter described in this disclosure generally relates to systems, devices, and processes for inspecting objects (e.g., cargos or containers) and other volumes for detecting certain substances or items e.g., prohibited items including explosives, weapons, and nuclear materials. More specifically, the present disclosure provides a technique for analyzing a reconstructed volume from the cosmic ray particle detector measurements as cosmic ray particles passing through the volume, and for identifying and characterizing objects within the volume.

BACKGROUND

Cosmic ray imaging and sensing are techniques which exploit the multiple Coulomb scattering of highly penetrating cosmic ray-produced muons to perform non-destructive inspection of the material without the use of artificial radiation. The Earth is continuously bombarded by energetic stable particles, mostly protons, coming from deep space. These particles interact with atoms in the upper atmosphere to produce showers of particles that include many short-lived pions which decay producing longer-lived muons. Muons interact with matter primarily through the Coulomb force having no nuclear interaction and radiating much less readily than electrons. Such cosmic ray-produced particles slowly lose energy through electromagnetic interactions. Consequently, many of the cosmic ray produced muons arrive at the Earth's surface as highly penetrating charged radiation. The muon flux at sea level is about 1 muon per $cm^2$ per minute.

As a muon moves through material, Coulomb scattering off of the charges of sub-atomic particles perturb its trajectory. The total deflection depends on several material properties, but the dominant effects are the atomic number, Z, of nuclei and the density of the material. The trajectories of muons are more strongly affected by materials that make good gamma ray shielding, such as lead and tungsten, and by special nuclear materials (SNM), such as uranium and plutonium, than by materials that make up more ordinary objects such as water, plastic, aluminum and steel. Each muon carries information about the objects that it has penetrated. The scattering of multiple muons can be measured and processed to probe the properties of these objects. A material with a high atomic number Z and a high density can be detected and identified when the material is located, inside low-Z and medium-Z matter. In addition to muons, cosmic rays also generate electrons. Electrons are less massive and generally have lower momenta than muons and hence scatter more in a given material. Due to their larger scattering, electrons can be used to differentiate materials particularly those with low to medium Z and densities that may not significantly scatter muons.

Coulomb scattering from atomic nuclei in matter results in a very large number of small angle deflections of charged particles as they transit the matter. In some examples, a correlated distribution function can be used to approximately characterize the displacement and angle change of the trajectory that depends on the density and the atomic charge of the material. As an example, this distribution function can be approximated as a Gaussian distribution. The width of the distribution function is proportional to the inverse of the momentum of the particle and the square root of the real density of material measured in radiation lengths. The correlated distribution function of cosmic ray-produced particles (e.g., muons and electrons) can provide information on materials in the paths of the particles with no radiation dose above the Earth's background and proper detection of such cosmic ray-produced particles can be implemented in a way that is especially sensitive to selected materials to be detected such as good radiation shielding materials.

In some examples of cosmic ray imaging and sensing, a muon tomography system can be configured to perform tomography of a target object under inspection based on scattering of cosmic ray particles by the target object. For example, cosmic ray tomography systems can be used for detecting certain targeted objects, e.g., such as materials that can be used to threaten the public, including smuggled nuclear materials. Cosmic ray tomography detector systems can be used jointly with or an alternative to other nuclear material detectors such as gamma or X-ray detectors. Gamma and X-ray detectors operate by directing Gamma and X-ray radiation to a target and measuring penetrated Gamma and X-ray radiation. Shielding of nuclear materials can reduce the count rates in the Gamma and X-ray detectors and reduce the detection performance of Gamma and X-ray detectors. Cosmic ray tomography detection systems can be configured to detect shielded nuclear materials and objects.

In an example of a cosmic ray tomography detection system, the cosmic ray particle detectors can include arrays of drift-tube sensors configured to enable tomographic imaging of a volume of interest (VOI) using ambient cosmic rays as the illuminating radiation source. Cosmic ray charged particles, e.g., primarily muons and electrons, shower through the VOI, and measurement of individual particle tracks can be used to reconstruct the three-dimensional distribution of atomic number (Z) and density of materials in the VOI using particle scattering.

SUMMARY

Disclosed are techniques, systems, and devices for analyzing a content of a volume, such as a cargo or container, based on images obtained from cosmic ray particle detector measurements (as charged cosmic ray particles including muons and electrons passing through the volume) to detect certain targeted substances or objects/items that are present inside the volume or object under inspection. Object features are subsequently extracted from the detected objects based on their statistical and geometric properties. In one aspect, an image of a volume, such as a cargo, is reconstructed from the detector measurements as charged cosmic ray particles passing through the volume. The reconstructed image of the volume, which is also referred to as a reconstructed volume, is divided or partitioned into voxels with each voxel having an intensity value. The intensity value of each voxel may be computed and derived from the charged particles passing through the voxel and from detector measurements. Using image processing/computer vision techniques such as segmentation, binary and grayscale morphological analysis and connected components, the objects within the reconstructed volume are detected and object features are extracted from the detected objects. These features are then used by the classifier to determine if a given object is benign or a threat.

In one aspect, a technique for analyzing a reconstructed cosmic ray particle image of a volume of interest from cosmic ray imaging measurements to detect objects within the volume of interest is disclosed. This technique partitions the reconstructed cosmic ray particle image of the volume into a set of voxels wherein each voxel is associated with an intensity value. The technique next identifies a subset of the set of voxels as object-candidate voxels for generating objects by performing a segmentation operation on the reconstructed cosmic ray particle image of the volume. The segmentation operation subsequently generates a binary image of binary-valued voxels from the reconstructed image. Next, the technique performs one or more morphological operations on the binary image to improve connectedness of the binary-valued voxels and to remove noise. The technique then performs a connected-component analysis on the binary-valued voxels to label each group of connected binary-valued voxels with the same identifier, thereby identifying one or more objects within the reconstructed image of the volume.

In another aspect, a technique for analyzing a reconstructed charged particle image of a volume of interest from charged particle detector measurements to detect objects within the volume of interest is disclosed. This technique partitions the reconstructed charged particle image of the volume into a set of voxels wherein each voxel is associated with an intensity value. The technique next identifies a subset of the set of voxels as object-candidate voxels for generating objects by performing a segmentation operation on the reconstructed charged particle image of the volume. The segmentation operation subsequently generates a binary image of binary-valued voxels from the reconstructed charged particle image. Next, the technique performs a blob detection operation on the binary-valued voxels to identify one or more objects within the reconstructed charged particle image of the volume. The technique then extracts a set of object features from each identified object based at least on the associated intensity values and other properties of the voxels inside the identified object.

In yet another aspect, a technique for extracting features from objects identified within a reconstructed charged particle image of a volume of interest from charged particle detector measurements is disclosed. This technique partitions the reconstructed charged particle image of the volume into a set of voxels wherein each voxel is associated with an intensity value. The technique next performs a segmentation operation on the reconstructed charged particle image to identify a subset of the set of voxels as object-candidate voxels for generating objects. The technique then performs a connected-component analysis on the object-candidate voxels to identify one or more objects within the reconstructed charged particle image of the volume. Next, the process extracts a set of object features from each identified object based at least on the associated intensity values and other properties of the voxels inside the identified object.

In another aspect, a system for analyzing a reconstructed charged particle image of a volume from charged particle detector measurements to detect objects within the volume is disclosed. The system includes a processor, a memory, and an image processing mechanism coupled to the processor and the memory. This image processing mechanism is configured to: partition the reconstructed charged particle image of the volume into a set of voxels wherein each voxel is associated with an intensity value; identify a subset of the set of voxels as object-candidate voxels for generating objects by performing a segmentation operation on the reconstructed charged particle image of the volume; and identify one or more objects within the reconstructed charged particle image of the volume by performing a connected-component analysis on the object-candidate voxels.

BRIEF DESCRIPTION OF THE DRAWINGS

FIG. 3 illustrates an example of analyzing reconstructed volumes of a block of depleted uranium positioned some distance above the floor.

FIG. 4 illustrates an example of analyzing reconstructed volumes of a block of depleted uranium placed on paper pallet.

FIG. 5 illustrates an example of analyzing reconstructed volumes of a first block of depleted uranium positioned at center and a second block of depleted uranium of different size positioned at corner.

DETAILED DESCRIPTION

Figure 1:
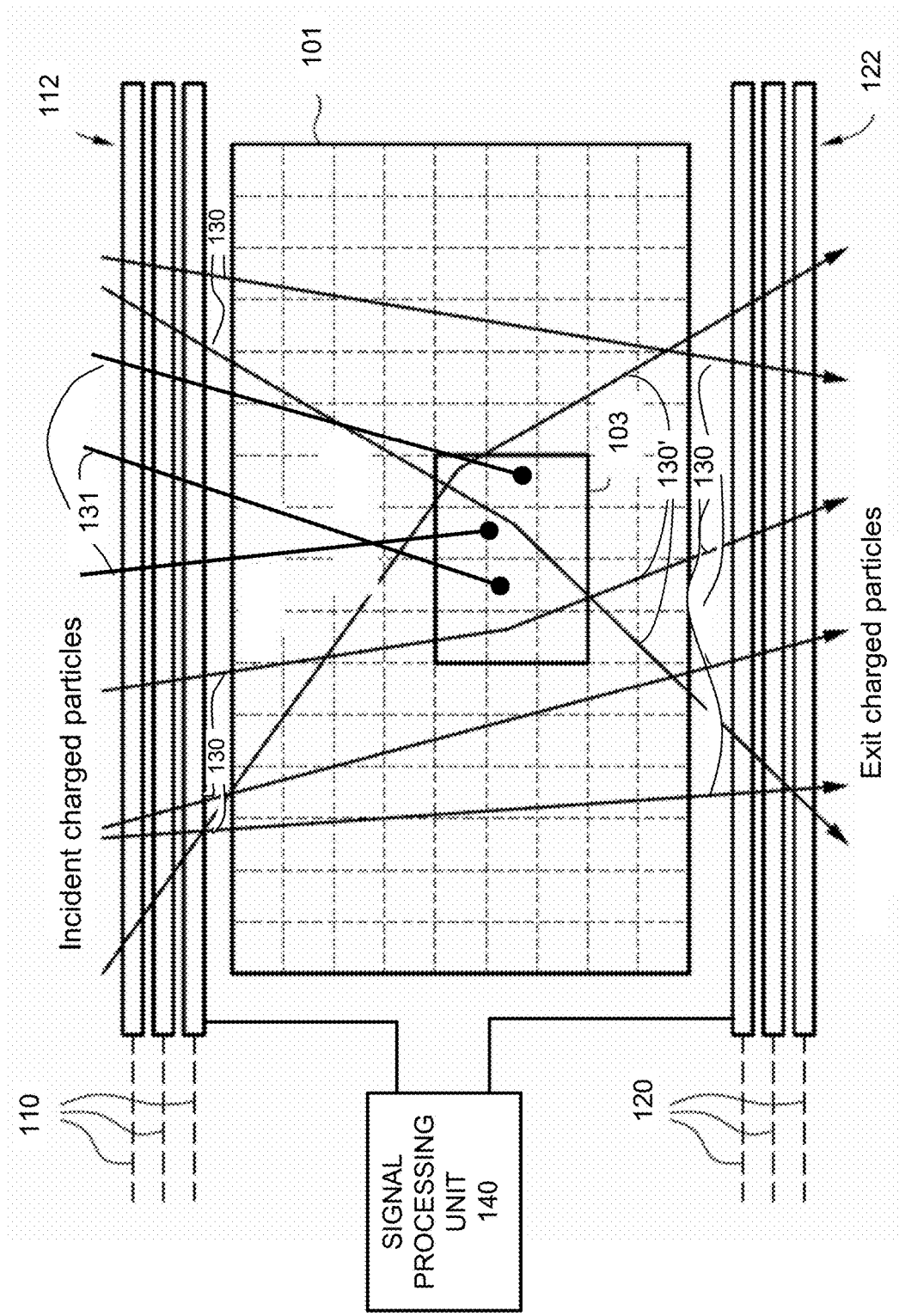
FIG. 1 shows an exemplary cosmic-ray particle tomography system in accordance with some embodiments described herein.

In some examples of cosmic ray imaging and sensing, a tomography system can be configured to perform tomography of a target volume or object under inspection based on scattering of the charged particles by the target volume or object. For example, muon tomography systems can be used for detecting certain targeted objects, e.g., such as materials that can be used to threaten the public, including smuggled nuclear materials. Cosmic ray tomography detector systems can be used jointly with or an alternative to other nuclear material detectors such as gamma or X-ray detectors. Gamma and X-ray detectors operate by directing Gamma and X-ray radiation to a target and measuring penetrated Gamma and X-ray radiation. Shielding of nuclear materials can reduce the count rates in the Gamma and X-ray detectors and reduce the detection performance of Gamma and X-ray detectors. Cosmic ray tomography detection systems can be configured to detect shielded nuclear materials and objects.

In an example of a muon tomography detection system, the muon detectors can include arrays of drift-tube sensors configured to enable tomographic imaging of a volume of interest (VOI) using ambient cosmic rays as the illuminating radiation source. Cosmic ray charged particles, e.g., primarily muons and electrons, shower through the VOI, and measurement of individual particle tracks can be used to reconstruct the three-dimensional distribution of atomic number (Z) and density of materials in the VOI using particle scattering.

Disclosed are techniques, systems, and devices for analyzing a reconstructed image of the volume or a "reconstructed volume," such as a cargo volume, from cosmic ray particle detector measurements (as cosmic ray particles passing through the volume) to detect objects from the reconstructed volume. Object features are subsequently extracted from the detected objects based on their statistical and geometric properties. These features are then used by the classifier to determine if a detected object is benign or a threat.

In one aspect, a cargo volume is reconstructed from the muon detector measurements of muons passing through the volume. The reconstructed 3D image volume (also referred to as "the reconstructed volume" hereinafter) may be divided into voxels with each voxel being associated with an intensity value. The intensity value of each voxel may be computed and derived from the detector's measurements and charged particle track information. Using image processing/computer vision techniques such as segmentation, binary and grayscale morphological operations and connected components analysis, the objects are detected and object features are extracted from the detected objects.

In one aspect, a technique for analyzing a reconstructed cosmic ray particle image of a volume of interest from cosmic ray imaging measurements to detect objects within the volume of interest is disclosed. This technique partitions the reconstructed cosmic ray particle image of the volume into a set of voxels wherein each voxel is associated with an intensity value. The technique next identifies a subset of the set of voxels as object-candidate voxels for generating objects by performing a segmentation operation on the reconstructed cosmic ray particle image of the volume. The segmentation operation subsequently generates a binary image of binary-valued voxels from the reconstructed image. Next, the technique performs one or more morphological operations on the binary image to improve connectedness of the binary-valued voxels and to remove noise. The technique then performs a connected-component analysis on the binary-valued voxels to label each group of connected binary-valued voxels with the same identifier, thereby identifying one or more objects within the reconstructed image of the volume.

In another aspect, a technique for analyzing a reconstructed charged particle image of a volume of interest from charged particle detector measurements to detect objects within the volume of interest is disclosed. This technique partitions the reconstructed charged particle image of the volume into a set of voxels wherein each voxel is associated with an intensity value. The technique next identifies a subset of the set of voxels as object-candidate voxels for generating objects by performing a segmentation operation on the reconstructed charged particle image of the volume. The segmentation operation subsequently generates a binary image of binary-valued voxels from the reconstructed charged particle image. Next, the technique performs a blob detection operation on the binary-valued voxels to identify one or more objects within the reconstructed charged particle image of the volume. The technique then extracts a set of object features from each identified object based at least on the associated intensity values and other properties of the voxels inside the identified object.

In yet another aspect, a technique for extracting features from objects identified within a reconstructed charged particle image of a volume of interest from charged particle detector measurements is disclosed. This technique partitions the reconstructed charged particle image of the volume into a set of voxels wherein each voxel is associated with an intensity value. The technique next performs a segmentation operation on the reconstructed charged particle image to identify a subset of the set of voxels as object-candidate voxels for generating objects. The technique then performs a connected-component analysis on the object-candidate voxels to identify one or more objects within the reconstructed charged particle image of the volume. Next, the process extracts a set of object features from each identified object based at least on the associated intensity values and other properties of the voxels inside the identified object.

In another aspect, a system for analyzing a reconstructed charged particle image of a volume from charged particle detector measurements to detect objects within the volume is disclosed. The system includes a processor, a memory, and an image processing mechanism coupled to the processor and the memory. This image processing mechanism is configured to: partition the reconstructed charged particle image of the volume into a set of voxels wherein each voxel is associated with an intensity value; identify a subset of the set of voxels as object-candidate voxels for generating objects by performing a segmentation operation on the reconstructed charged particle image of the volume; and identify one or more objects within the reconstructed charged particle image of the volume by performing a connected-component analysis on the object-candidate voxels.

The cosmic-ray particle detection systems and methods described in this application can be implemented to detect presence of certain objects or materials such as nuclear materials and to obtain tomographic information of such objects in various applications including but not limited to inspecting packages, containers, occupied vehicles at security check points, border crossings and other locations for nuclear threat objects that may range from fully assembled nuclear weapons to small quantities of highly shielded nuclear materials. Features described in this application can be used to construct various particle detection systems.

For example, a particle detection system can include an object holding area for placing an object to be inspected, a first set of position sensitive cosmic-ray particle detectors located on a first side of the object holding area to measure positions and directions of incident cosmic-ray particle towards the object holding area, a second set of position sensitive cosmic-ray particle detectors located on a second side of the object holding area opposite to the first side to measure positions and directions of outgoing cosmic-ray particle exiting the object holding area, and a signal processing unit, which may include, e.g., a microprocessor, to receive data of measured signals of the incoming charged particles from the first set of position sensitive cosmic-ray particle detectors and measured signals of the outgoing cosmic-ray particle from the second set of position sensitive particle detectors. As an example, each of the first and second sets of particle detectors can be implemented to include drift tubes arranged to allow at least three charged particle positional measurements in a first direction and at least three charged particle positional measurements in a second direction different from the first direction. The signal processing unit is configured to analyze scattering behaviors of the cosmic-ray particles caused by scattering of the cosmic-ray particles in the materials within the object holding area based on the measured incoming and outgoing positions and directions of cosmic-ray particle to obtain a tomographic profile or the spatial distribution of scattering centers within the object holding area.

The obtained tomographic profile or the spatial distribution of scattering centers can be used to reveal the presence or absence of one or more objects in the object holding area such as materials with high atomic numbers including nuclear materials or devices. Each position sensitive particle detector can be implemented in various configurations, including drift cells such as drift tubes filled with a gas which can be ionized by charged particles. Such a system can be used to utilize naturally occurring cosmic-ray particles as the particle source for detecting one or more objects in the object holding area.

In applications for portal monitoring, the illustrative embodiments provide an approach to enable robust nuclear material detection at reduced cost and with increased effectiveness. Furthermore, the approach can provide a radiation portal monitor which is capable of determining if a given vehicle or cargo is free of nuclear threats by both measuring the absence of a potential shielded package and the absence of a radiation signature.

The portal monitoring systems of the illustrative embodiments shown in the accompanying drawings employ cosmic ray-produced charged particle tracking with drift tubes. As will be explained in more detail below, the portal monitoring systems utilize drift tubes to enable tracking of charged particles, such as muons and electrons, passing through a volume as well as detection of gamma rays. Advantageously, these portal monitoring systems can effectively provide the combined function of a cosmic ray radiography apparatus with passive or active gamma radiation counter to provide a robust detector for nuclear threats. This eliminates the need for two separate instruments.

Cosmic ray tomography is a technique which exploits the multiple Coulomb scattering of highly penetrating cosmic ray-produced muons to perform non-destructive inspection of the material without the use of artificial radiation. The Earth is continuously bombarded by energetic stable particles, mostly protons, coming from deep space. These particles interact with atoms in the upper atmosphere to produce showers of particles that include many short-lived pions which decay producing longer-lived muons. Muons interact with matter primarily through the Coulomb force having no nuclear interaction and radiating much less readily than electrons. They lose energy only slowly through electromagnetic interactions. Consequently, many of the cosmic ray-produced muons arrive at the Earth's surface as highly penetrating charged radiation. The muon flux at sea level is about 1 muon per $cm^2$ per minute.

As a muon moves through material, Coulomb scattering off of the charges of sub-atomic particles perturb its trajectory. The total deflection depends on several material properties, but the dominant effect is the atomic number, Z, of nuclei. The trajectories are more strongly affected by materials that make good gamma ray shielding (such as lead and tungsten for example) and by special nuclear material (SNM), that is, uranium and plutonium, than by materials that make up more ordinary objects such as water, plastic, aluminum and steel. Each muon carries information about the objects that it has penetrated, and by measuring the scattering of multiple muons one can probe the properties of these objects. A material with a high atomic number Z and a high density can be detected and identified when the material is located, inside low-Z and medium-Z matter.

Coulomb scattering from atomic nuclei results in a very large number of small angle deflections of charged particles as they transit the matter. Enrico Fermi found and solved a transport equation that describes this process to a good approximation. The result is a correlated Gaussian distribution function for the displacement and angle change of the trajectory that depends on the density and the atomic charge of the material. The width of the distribution function is proportional to the inverse of the momentum of the particle and the square root of the real density of material measured in radiation lengths. Further background can be found in the reference of K. N Borozdin et al. entitled "Surveillance: Radiographic Imaging with Cosmic Ray Muons", published in Nature (2003), 422, 277.

Cosmic ray-produced muons and electrons can provide information with no radiation dose above the earth's background and proper detection of such cosmic ray-produced muons and electrons can be implemented in a way that is especially sensitive to good shielding materials. A detection system can be configured to perform tomography of a target object under inspection based on scattering of muons and electrons by the target object. The system can be configured to perform tomography to localize scattering (RC & LS). The tomographic position resolution can be expressed approximately as follows:

$$\Delta x = \theta_{RMS} L$$

where:
$\theta_{RMS}$=the root-mean-square (rms) of the scattering angle, and
L=the size of the volume under the detection by the detection apparatus.

For example, for an exemplary rms scattering angle of 0.02 radian and an apparatus size of 200 cm, the tomographic position resolution is 0.02×200 cm=4 cm.

In one approach, the angular resolution is determined by the following equation based on the Poisson statistics:

$$\frac{\Delta \theta}{\theta} = \frac{1}{\sqrt{2N}}$$

where:
θ=the rms scattering angle,
N=number of cosmic ray-produced muons and/or electrons passing through a region of interest.

For example, the angular resolution for N=100 (corresponding to a 10×10 cm² resolution element after one minute of counting) is Δθ=0.070.

Tomographic methods, designed to construct an image or model of an object from multiple projections taken from different directions, can be implemented in the cosmic ray system to provide a discrete tomographic reconstruction of the volume of interest based on the data provided by the cosmic-ray particles. In some implementations, Monte Carlo simulation techniques can be used to study applications and shorten scanning times. Other stochastic processing methods may also be used in implementing the cosmic ray tomographic imaging described in this application.

The cosmic ray radiography function of the particle detection systems of the embodiments can be more readily understood with reference to examples of detection systems adapted to detect cosmic ray-produced charged particles such as those shown in FIG. 1. Referring initially to FIG. 1, which illustrates a detection system utilizing cosmic-ray particles to detect an object, system 100 includes a set of two or more planes 110 of incoming charged particle detectors 112 arranged above a volume 101 to be imaged as the first array of detectors for providing the position and angles (i.e., directions in the 3-D space) of incoming charged particle tracks 130 and 131. The incoming charged particle detectors 112 are configured to measure the position and angles of incoming charged particle tracks 130 and 131 with respect to two different directions, e.g., in two orthogonal coordinates along x and y axes. Charged particles (e.g., muons and electrons) pass through the volume 101 where the VOI 103 may be located and are scattered to an extent dependent upon the material occupying the volume 103 through which they pass. Another set of two or more planes 120 of outgoing charged particle detectors 122 are configured as the second array of detectors to record outgoing charged particle positions and directions. The drift tubes in detectors 112 and 122 are arranged to allow at least three charged particle positional measurements in a first direction and at least three charged particle positional measurements in a second direction which is different from the first direction and may be orthogonal to the first direction. Side detectors (not shown) may be used to detect more horizontally orientated muon tracks. The scattering angle of each charged particle is computed from the incoming and outgoing measurements.

A signal processing unit 140, e.g., a computer, is provided in the system 100 to receive data of measured signals of the incoming charged particles by the detectors 112 and outgoing charged particles by the detectors 122. This signal processing unit 140 is configured to analyze the scattering of the charged particles in the volume 101 based on the measured incoming and outgoing positions and directions of charged particles to obtain a tomographic profile or the spatial distribution of the scattering density reflecting the scattering strength or radiation length within the volume 101. The obtained tomographic profile or the spatial distribution of the scattering density within the volume 101 can reveal the content of the VOI 103 in the volume 101. FIG. 1 shows drift tube detectors 112 and 122 are located on top and bottom sides of the volume 101. In some implementations, additional drift tube detectors can be implemented on sides of the volume 101 to form a box or four sided structure into which a package, a vehicle or cargo container can enter for scanning by the system.

The processing of measurements for cosmic ray particles in a volume under inspection (e.g., a package, a container or a vehicle) by the signal processing unit 140 for the system 100 in FIG. 1, and other systems described in this application can include reconstructing the trajectory of a charged particle such as a muon or an electron through the volume 101, measuring the momentum of an incoming charged particle based on signals from the detectors 112, measuring the momentum of an outgoing charged particle based on signals from the detectors 122, and determining the spatial distribution of the scattering density of the volume 101. These and other processing results can be used to construct the tomographic profile and measure various properties of the volume 101.

For example, the reconstruction of the trajectory of a charged particle passing through a detector having a set of drift cells can include (a) obtaining hit signals representing identifiers of drift cells hit by charged particles and corresponding hit times; (b) grouping in-time drift cell hits identified as being associated with a track of a particular charged particle passing through said detector; (c) initially estimating a time zero value for a moment of time at which said particular charged particle hits a drift cell; (d) determining drift radii based on estimates of the time zero values, drift time conversion data and the time of the hit; (e) fitting linear tracks to drift radii corresponding to a particular time zero value; and (f) searching and selecting a time-zero value associated with the best of the track fits performed for a particular charged particle and computing error in time-zero and tracking parameter. Such reconstruction of the track based on the time zero fit provides a reconstructed linear trajectory of the charged particle passing through the charged particle detector without having to use fast detectors (such as photomultiplier tubes with scintillator paddles) or some other fast detector which detects the passage of the muon through the apparatus to the nearest few nanoseconds to provide the time-zero.

Also for example, the processing for measuring the momentum of an incoming or outgoing charged particle based on signals from the detectors can include, for example, (a) configuring a plurality of position sensitive detectors to scatter a charged particle passing therethrough; (b) measuring the scattering of a charged particle in the position sensitive detectors, wherein measuring the scattering comprises obtaining at least three positional measurements of the scattering charged particle; (c) determining at least one trajectory of the charged particle from the positional measurements; and (d) determining at least one momentum measurement of the charged particle from the at least one trajectory. This technique can be used to determine the momentum of the charged particle based on the trajectory of the charged particle which is determined from the scattering of the charged particle in the position sensitive detectors themselves without the use of additional metal plates in the detector.

Also for example, the spatial distribution of the scattering density of the volume can be determined from charged particle tomographic data by: (a) obtaining predetermined charged particle tomography data corresponding to scattering angles and estimated momentum of charged particles passing through object volume; (b) providing the probability distribution of charged particle scattering for use in an image reconstruction technique such as an expectation maximization (ML/EM) technique, the probability distribution being based on a statistical multiple scattering model; (c) determining an estimate of the object volume density, e.g., by determining a substantially maximum likelihood estimate using the expectation maximization (ML/EM) technique; and (d) outputting reconstructed object volume scattering density. The reconstructed object volume scattering density can be used to identify the presence and/or type of object occupying the volume of interest from the reconstructed volume density profile. Various applications include cosmic ray particles tomography for various homeland security inspection applications in which vehicles or cargo can be scanned by a charged particle tracker.

The tomographic processing part of the signal processing unit 140 may be implemented in a computer at the same location as the detectors 112 and 122. Alternatively, the tomographic processing part of the signal processing unit 140 may be implemented in a remote computer that is connected on a computer network such as a private network or a public network such as the Internet.

Further referring to FIG. 1, note that incoming charged particle detectors 112 can detect the X-Y position, angle, speed, and momentum of each of the incident charged particles 130 and 131 entering the volume 101, while outgoing charged particle detectors 122 can detect the X-Y position, angle, speed, and momentum of each of the exiting charged particles 130 passing through volume 101. The signal processing unit 140 is configured to process the position, angle, speed, and momentum data collected by detectors 112 and detectors 122 to match each incident charged particle 130 with a corresponding exiting charged particle 130. The signal processing unit 140 is also configured to process the position, angle, speed, and momentum data collected by detectors 112 and detectors 122 to identify those exiting charged particles 130 that are scattered by VOI 103, such as charged particles 130', and generate a scattering number for the incident charged particles. The signal processing unit 140 is also configured to process the position, angle, speed, and momentum data collected by detectors 112 and detectors 122 to identify incident charged particles 131 which are then stopped inside VOI 103 and generate a stopping number for the incident charged particles.

Further detail of cosmic-ray particle tomography systems which can be used to detect and identify content of a VOI exposed to cosmic ray particles based on the measured scattering and stopping characteristics of the cosmic ray particles is described in U.S. Pat. No. 8,247,767 entitled "PARTICLE DETECTION AND APPLICATIONS IN SECURITY AND PORTAL MONITORING" filed on Oct. 26, 2007, the content of which is incorporated by reference as part of the specification of this application.

Charged particles (such as electrons and muons) passing through matter interact by scattering from the atoms and by being absorbed by them ("stopping"). Some existing techniques rely primarily on the muon component of cosmic rays to interrogate a Volumes of Interest (VOI). Muons, highly energetic and massive, can pass essentially un-scattered through materials of light atomic mass and are typically only weakly scattered by conventional metals used in industry (e.g., aluminum, iron, steel, and the like). Substantial scattering and absorption generally only occur when muons encounter sufficient thicknesses of heavy elements such as lead and tungsten, and special nuclear materials (SNM), such as uranium and plutonium.

Using an above-described cosmic-ray particle detection system, a volume, such as a package, a cargo, a container, or an occupied vehicle, can be reconstructed from the cosmic ray imaging measurements of charged particles including muons passing through the volume. Next, the reconstructed volume is divided or partitioned into voxels with each voxel having an intensity value. More specifically, the intensity value of each voxel may be computed and derived from the muon detector measurements which can include both scattering and stopping of muons inside the voxel. In one embodiment, the voxel intensity is derived from the scattering density of the muons passing through the voxel. The scatter density is computed from the momentum, scattering angle, estimated thickness of scatter, and nominal muon scattering angle, and can be expressed as:

$$\text{Scattering density} = \frac{(P^2 * \theta^2)}{L * p_0^2}$$

where, P is the momentum, $\theta$ is the scattering angle, L is the estimated thickness of scatter, and $p_o$ is the nominal scattering angle. In addition to the intensity value, each voxel can also be associated with other values, such as a location vector, momentum, and a scattering angle, among others. In some embodiments, the reconstructed volume is preprocessed to enhance the image to prepare for better detection of objects and features within the volume. For example, a gradient smoothing technique may be used for the preprocessing operation.

Next, the reconstructed volume is analyzed. More specifically, by applying image processing/computer vision techniques such as segmentation, binary and grayscale morphological analysis, and connected-component analysis on the voxels associated with intensity values, objects can be detected as "Blobs" in this volume. Blobs are regions of voxels with similar properties. In one embodiment, when performing morphological operations, a structuring element (or a kernel) in the shape such as a sphere or a cube can be used on a segmented volume to ensure the connectedness of each voxel to adjacent voxels if the criteria for the structural element is met by a given voxel. Next, a connected-component analysis is performed on voxels to test for connectedness. The connected-component analysis labels those connected voxels to identify objects, wherein a group of voxels connected to one another get the same label to mark the same object. During the connected-component analysis, when a voxel is found to be not connected to an existing object but satisfy the criteria for the connectivity type of that object, then this voxel gets the same label associated with the object.

Identified objects may be relabeled to sort the objects for the convenient of analysis. For example, one way of relabeling is to sort data by the sizes of the objects, and then relabel these objects with the largest size objected labeled "1," the next largest size object as "2," etc. Note that the particular structure and size of the structuring element used during morphological analysis may depend on particular situations. These particular situations can include particular actions such as isolating and labeling objects, or removing specific noise. The particular situations can also include different voxel sizes. As an example, a sphere of radius size 1 may be used on minimum size of target objects to be detected and the actual size of the structure element may be determined by the size of the voxels. Specific sizes and configurations of structure element the may be used to target specific situations. Sometimes the sizes and configurations have to be adjusted for resolution in the system.

While using full connectedness during connected-component analysis can typically yield more accurate result, in some situations partial connectedness can also yield reasonable results. Some of the objects may or may not be removed from the object list based on predetermined criteria in order to help classification. Once the set of objects are detected from the volume, these detected objects can then be characterized based on their statistical and geometric properties. For each object, a set of features can be extracted for analysis and classification.

Figure 2:
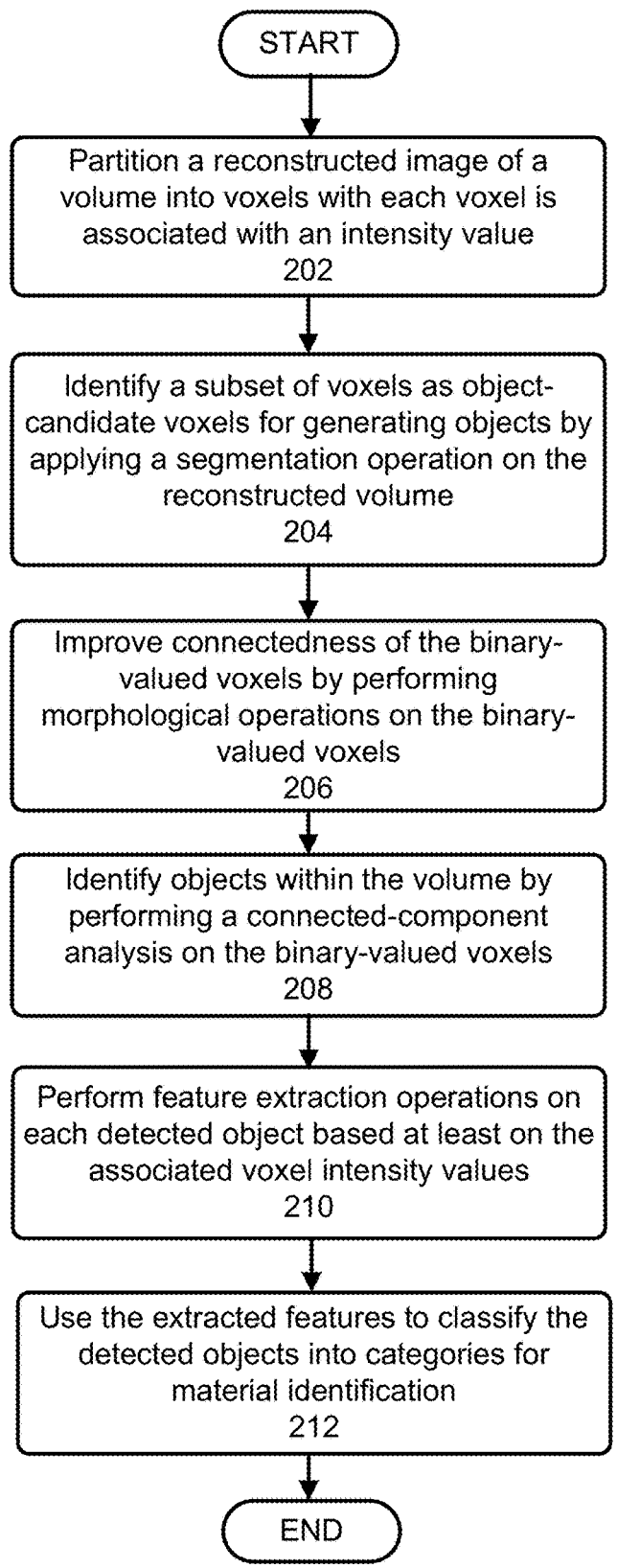
FIG. 2 presents a flowchart illustrating a process of analyzing a reconstructed volume from cosmic ray imaging measurements using image processing/computer vision techniques to detect and characterize objects within the volume, and to extract features from the detect objects for classification in accordance with some embodiments described herein.

FIG. 2 presents an example of a flowchart illustrating a process of analyzing a reconstructed volume from cosmic ray imaging measurements using image processing/computer vision techniques to detect and characterize objects within the volume, and to extract features from the detect objects for classification. During operation, the reconstructed volume is partitioned into voxels with each voxel associated with an intensity value (step 202). Next, a segmentation operation is applied on reconstructed volume to identify qualified voxels as candidate voxels to objects (step 204). In one embodiment, the segmentation operation uses a high threshold and low threshold to label each voxel as either an object-candidate voxel or a non-object voxel. A voxel with an intensity value below the low threshold or a value above the high threshold is labeled with a binary value (1 or 0) to indicate that the voxel is not a candidate of an object (i.e., non-object voxel). A voxel with an intensity value between the low threshold and the high threshold is labeled with an opposite binary value (0 or 1) to indicate that the voxel is a candidate of an object (i.e., object-candidate voxel).

After the segmentation operation on the reconstructed volume, one or more binary morphological operations are applied to the binary-valued voxels to improve connectedness of the binary-valued voxels (step 206). More specifically, this step is used to "fill holes" inside a cluster of object-candidate voxels that belong to the same object, i.e., reversing the binary values of those non-object voxels (i.e., incorrectly segmented) if they are surrounded by object-candidate voxels. In doing so, the process identifies additional object-candidate voxels which has been falsely labeled as non-object voxels, thereby improving connectedness of clusters of the object-candidate voxels and clusters of non-object voxels.

In one embodiment, the binary morphological operations include a morphological erosion operation followed by a morphological dilation operation (referred to as "morphological open process"). In another embodiment, the binary morphological operations include a morphological dilation operation followed by a morphological erosion operation (referred to as "morphological close process"). In some embodiments, the binary morphological operations include other combinations of morphological dilation operation and morphological erosion operation. For example, when performing a morphological close process, a morphological dilation operation applies a structuring element (or a kernel) in the shape such as a sphere or a cube on the segmented volume. More specifically, the structuring element comprises a group of voxels, and when the structure element is applied to a given voxel in the segmented volume, all voxels within the space of the structuring element gets the binary value of the voxel being operated on. The operation is repeated for all the voxels in the segmented volume. While the morphological dilation operation improves the connectedness of each voxel to its adjacent voxels by reversing incorrectly-segmented adjacent voxels, this operation also creates an artificial "layer" of object-candidate voxels to each potential object. Consequently, a morphological erosion operation may then be applied on the processed voxels in the segmented volume to remove this artificial "layer" of voxels.

After improving the connectedness of binary-valued voxels in the segmented volume, the process then proceeds to identify unique objects within the segmented volume by applying a connected-component analysis to the binary-valued voxels (step 208). During this step, each cluster of connected object-candidate voxels is marked with a common identifier, such as a unique numeral value, to identify a unique object. For example, different clusters of connected object-candidate voxels may be marked sequentially as "1," "2," "3," etc. In one embodiment, when marking a cluster of voxels as the same object, if a voxel is found to be not connected to the object but satisfy the criteria for the connectivity type of that object, the voxel may be marked as the object. The criteria used may include both full and partial connectedness. In one embodiment, full connectedness refers to that the voxel in question is connected to all the adjacent voxels (i.e., horizontally, vertically and diagonally in three dimensional (3D). Hence, in the case of a radius of 1 voxel, the full connectedness would consider a total of 27 connected voxels. Partial connectedness refers to other configurations, for example the voxel in question is connected to all the other voxels horizontally and vertically but not diagonally, or the voxel may be only connected diagonally but not in the horizontal or vertical directions.

When identifying objects within the segmented volume, a structuring element (or a kernel) in the shape such as a sphere or a cube can be used to ensure full or partial connectedness of each voxel to adjacent voxels. Once the objects are detected from the reconstructed volume, feature extraction operations are performed on each detected object based at least on the original voxel intensity values (step 210). The extracted features are then used to classify the object into categories for material identification purposes (step 212).

In another variation to the above-described process, a process of analyzing a reconstructed volume includes substantially all the steps of FIG. 2 but without step 206 (i.e., without performing the morphological dilation operation and morphological erosion operation).

In yet another variation to the above-described process, a process of analyzing a reconstructed volume includes substantially all the steps of FIG. 2 but uses a process of Blob detection to replace steps 206-208. Blobs are regions of voxels with similar properties and Blob detection refers to mathematical techniques to identify regions of similar voxels which are different from the voxels in the background.

In yet another variation to the above-described process, a process of analyzing a reconstructed volume includes substantially all the steps of FIG. 2 except that that step 206 (morphological operations) is omitted.

In yet another variation to the above-described process, a process of analyzing a reconstructed volume includes substantially all the steps of FIG. 2 but step 206 (morphological operations) is omitted. Instead, grayscale morphological operations are performed on the intensity image of step 202 prior to performing the segmentation operation 204. These grayscale morphological operations can include one of: a grayscale morphological close operation, a grayscale morphological open operation, or a combination-based (combining the grayscale morphological close operation and the grayscale morphological open operation) operation.

In a variation to the above-described process, a process of analyzing a reconstructed volume includes substantially all the steps of FIG. 2 but can include an additional operation of gradient based convolution on the reconstructed volume prior to the step 204 of segmentation operation.

In one embodiment, each of the above-described processes of analyzing a reconstructed volume is executed multiple times, each time with different parameters. The results from the multiple executions are then combined to form the object list for analysis, including feature extraction operations. The extracted features are then used to classify the object into categories for material identification purposes.

In another embodiment, each of the above-described processes of analyzing a reconstructed volume is executed with adaptive thresholds (during the process of segmentation) that are automatically computed based on volume being analyzed. The subsequently extracted features are then used to classify the object into categories for material identification purposes.

In another embodiment, each of the above-described processes of analyzing a reconstructed volume is executed multiple times with adaptive thresholds during the process of segmentation, each time with different parameters. The results from the multiple executions are then combined to form the object list for analysis, including feature extraction operations. The extracted features are then used to classify the object into categories for material identification purposes.

In another embodiment, each of the above-described processes of analyzing a reconstructed volume may be combined with additional techniques, processes or steps to obtain final results. The subsequently extracted features are then used to classify the object into categories for material identification purposes.

In another embodiment, each of the above-described processes of analyzing a reconstructed volume may include a pre-processing step on the input reconstructed volume. The subsequently extracted features are then used to classify the object into categories for material identification purposes.

In another embodiment, each of the above-described processes of analyzing a reconstructed volume may include a pre-processing step on the input reconstructed volume. The pre-processing step may include a gradient smoothing or other enhancement operations. The subsequently extracted features are then used to classify the object into categories for material identification purposes.

In another embodiment, each of the above-described processes of analyzing a reconstructed volume may include a clustering step to partition an object based on specific properties into a set of smaller objects. The subsequently extracted features are then used to classify the object into categories for material identification purposes.

Recall that during the object detection process, the voxels that comprise the reconstructed cargo volume are analyzed, and those voxels with intensity values that fall between the low and high threshold values are identified to belong to the objects and form a binary image. In some embodiments, multiple sets of thresholds may be used to increase the set of voxels that can form the objects. The selected set of voxels is then conditioned using morphological operators such as dilation and erosion. The resulting voxels are checked for connectedness and those voxels that fit the connectedness criteria are labeled to generate the objects. The final set of labeled objects is then analyzed for features.

During the volume reconstruction process, the voxel properties such as voxel size are configurable depending on the type of objects being analyzed. Resolution of the reconstruction can be enhanced by using smaller voxel sizes, but at the expense of longer computation time. In practice, trade-offs need to be made in selecting voxel sizes. In some implementations, small voxel sizes of one centimeter per voxel has been used for the volume reconstruction as well as feature extraction. Larger voxel sizes will also work in a similar manner. However, an optimal voxel size may be determined for a given object based on a set of criteria.

FIGS. 3-5 illustrate various examples of analyzing reconstructed volumes to detect and characterize objects within the volumes using the above-described processes involving image processing/computer vision techniques.

FIG. 3 illustrates an example of analyzing reconstructed volumes of a block of depleted uranium positioned some distance above the floor. The image on the left shows the acquired muon image while the image on the right shows the processed image with detected objects.

FIG. 4 illustrates an example of analyzing reconstructed volumes of a block of depleted uranium placed on paper pallet. The image on the left shows the acquired muon image while the image on the right shows the processed image with detected objects.

FIG. 5 illustrates an example of analyzing reconstructed volumes of a first block of depleted uranium positioned at center and a second block of depleted uranium of different size positioned at corner. The image on the left shows the acquired muon image while the image on the right shows the processed image with detected objects.

Once the volume reconstruction is complete, the volume is converted into a 3D image volume with each voxel assigned an intensity value. In one embodiment, the voxel intensity values are analyzed in conjunction with muon tracks related information, such as point of closest approach (PoCA) values, the flux values, and SumLogPTheta values generated from the muon detector measurements.

A PoCA value is a measure of the intersection of the incoming and outgoing muon trajectories. In a three-dimensional space, the extrapolated incoming and outgoing muon trajectories may not intersect. As a result, the distance between the two trajectories when they are closest to one another is calculated. This calculated distance is referred to as "the distance of closest approach" (DoCA). The midpoint of the DoCA is often referred to as the PoCA mentioned above.

The SumLogPTheta value may be calculated as $\Sigma_{i=1}^{N} \ln(p \times \theta)_i$, wherein $\theta$ is the scattering angle and $p$ is the momentum of the ith muon respectively.

Figure 6:
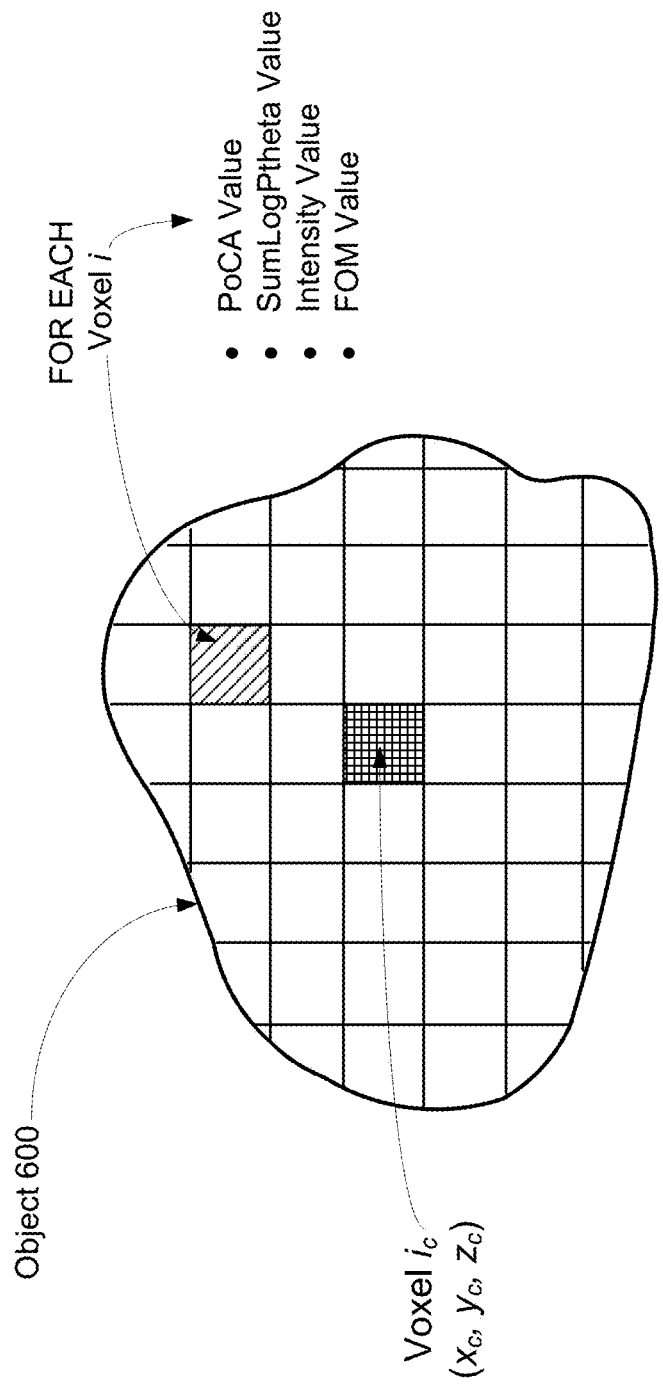
FIG. 6 illustrates an example of a detected object from a reconstructed volume.

FIG. 6 illustrates an example of a detected object 600 from a reconstructed volume. As can be seen in FIG. 6, object 600 is partitioned into voxels in the shape of a cube (note that other shapes can also be used instead of a cube), each voxel i is associated with a set of properties, which includes but are not limited to, an intensity value, a PoCA value, a SumLogPTheta value and a figure of merit (FOM) value (described below). A special voxel $i_c$ is located at the center of mass of object 600, wherein $(x_c, y_c, z_c)$ are the coordinates of the center of mass associated with voxel $i_c$. As described below, $(x_c, y_c, z_c)$ are used to compute a number of voxel features for each voxel i.

The reconstructed volume is segmented into a binary volume image, checked for morphological properties as well as connectivity between the selected voxels. Isolated groups of connected voxels form objects and these objects derive properties from the original intensity image and other spatial configuration of each of the connected voxels.

From this reconstructed volume, each labeled object is extracted and the following features may be characterized per object. Note that some of the object features described below are computed based on the spatial connections of the voxels in the object, voxel intensity values and a set of muon tracks related parameters.

1. Object Volume:

For each group of connected voxels that form the object, the total number of voxels are counted and is scaled by the volume of each voxel. The total volume of the object may be obtained as the volume occupied by all the voxels that comprise the object, including those voxels added by the morphological operations. Hence, the object volume may be computed as:

Volume=Count of all the object voxels×Volume of each voxel.

2. Average Intensity:

The average intensity of the object is the average intensity of all the connected voxels including those voxels added by morphological operations. The average intensity may be computed as:

AverageIntensity=$\Sigma_{i=1}^{N} I_i / N$, where N is the count of voxels in the object.

3. Variance of the Intensity:

The variance of the intensity of the object is a statistical metric of how much the voxel intensities vary within the object. This value computes the variance of all the intensity values of all the voxels that comprise the object:

Variance=$\Sigma_{i=1}^{N}(I_i-\text{AverageIntensity})^2/N$, where, N is the count of voxels in the object.

4. Figure of Merit PoCAFOM:

A figure of merit value based on the PoCA values may be computed as:

PoCAFOM=$\Sigma_{i=1}^{N}\text{SumLog}P\text{Theta}_i / \Sigma_{i=1}^{N}\text{PoCA\_Values}_i$ 5. Delta of the Intensity:

For all the connected voxels that form a part of each object, a histogram of the voxel intensities for the object is constructed and analyzed. The distance of the maximum intensity value (MaxIntensity) to the mean intensity value (AverageIntensity) is determined as below:

Delta=(MaxIntensity−AverageIntensity).

6. Maximum Value of all the PoCA Values Attributed to the Selected Object Voxels (MaxPoCA).

This metric may be computed by comparing the PoCA numbers attributed to each voxel with other voxels that are part of the same object.

MaxPoCA=MAX(PoCA_Values), where, i=1, 2, . . . , N.

7. Average PoCA:

An average PoCA value (AveragePoCA) of the object is the average of all of the PoCA values attributed to the object and may be computed as the sum of all the PoCA values attributed to the individual voxels in each object divided by the total number of voxels in the object:

AveragePoCA=$\Sigma_{i=1}^{N}\text{PoCA\_Values}_i/N$.

8. Total PoCA:

The total PoCA value (TotalPoCA) attributed to the object is computed as the sum of all the PoCA values attributed to the individual voxels in each object.

TotalPoCA=$\Sigma_{i=1}^{N}\text{PoCA\_Values}_i$.

9. Shape Ratio:

All the voxels that are connected to each other in a binary volume image are used to compute the largest end-to-end object length, referred to as "the major axis" and the shortest end-to-end object length, referred to as "the minor axis." A shape ratio is computed as the ratio of the two computed objected lengths.

ShapeRatio=Major Axis/Minor Axis.

A distance formula may be used to compute distance between two end voxels (x1, y1, z1) and (x2, y2, z2):

Distance=$\sqrt{((x1-x2)^2+(y1-y2)^2+(z1-z2)^2)}$.

10. Orientation of the Object:

The orientation of the object may be computed by first determining the major axis of the object as defined in #9 and then computing the angle that the major axis makes with respect to the horizontal direction.

Figure 7:
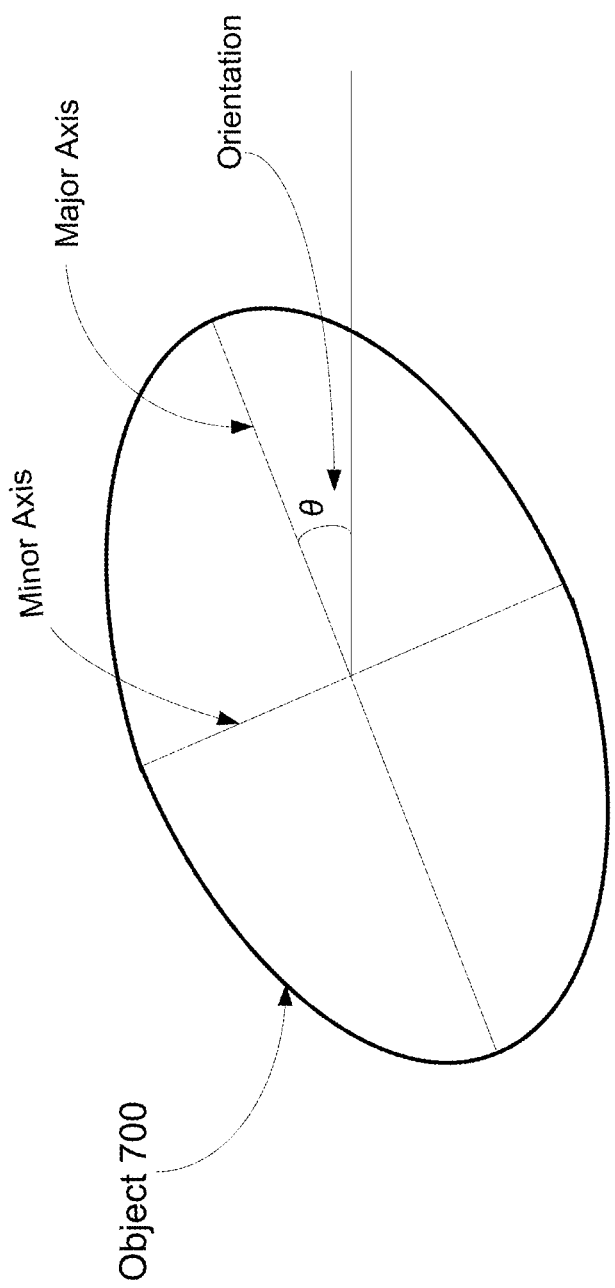
FIG. 7 illustrates an example of a detected object from a reconstructed volume showing the aforementioned major axis, minor axis, and the orientation of the object.

FIG. 7 illustrates an example of a detected object 700 from a reconstructed volume showing the aforementioned major axis, minor axis, and the orientation of the object.

11. IntensityDeltaVariation:

The IntensityDeltaVariation metric is obtained by first computing the max intensity (MaxIntensity), the average intensity (AverageIntensity) and the standard deviation of the intensities of all the voxels of the object and then computing the metric value by using the equation below:

IntensityDeltaVariation=(MaxIntensity−AverageIntensity)/$\sigma_i$, where, $\sigma_i$ is the standard deviation of the intensities of the voxels in the object.

12. PoCADeltaVariation:

A PoCADeltaVariation metric is obtained by first computing the max PoCA (MaxPoCA), the average PoCA (AveragePoCA) and the standard deviation of the PoCA values of all the voxels of the object and then computing the metric value by using the equation below:

PoCADeltaVariation=(MaxPoca−AveragePoCA)/$\sigma_p$, where $\sigma_p$ is the standard deviation of the PoCA values of the voxels in the object.

13. SumLogPThetaDeltaVariation:

The SumLogPThetaDeltaVariation is obtained by first computing the maximum of SumLogPTheta (MaxSumLogPTheta), the average SumLogPTheta (AvgSumLogPTheta) and the standard deviation of the SumLogPTheta values of all the voxels of the object and then computing the variation value by using the equation below:

SumLog$P$ThetaDeltaVariation=(MaxSumLog$P$Theta−AvgSumLog$P$Theta)/$\sigma_s$, where $\sigma_s$ is the standard deviation of the SumLogPTheta values of the voxels in the object.

Figure 8:
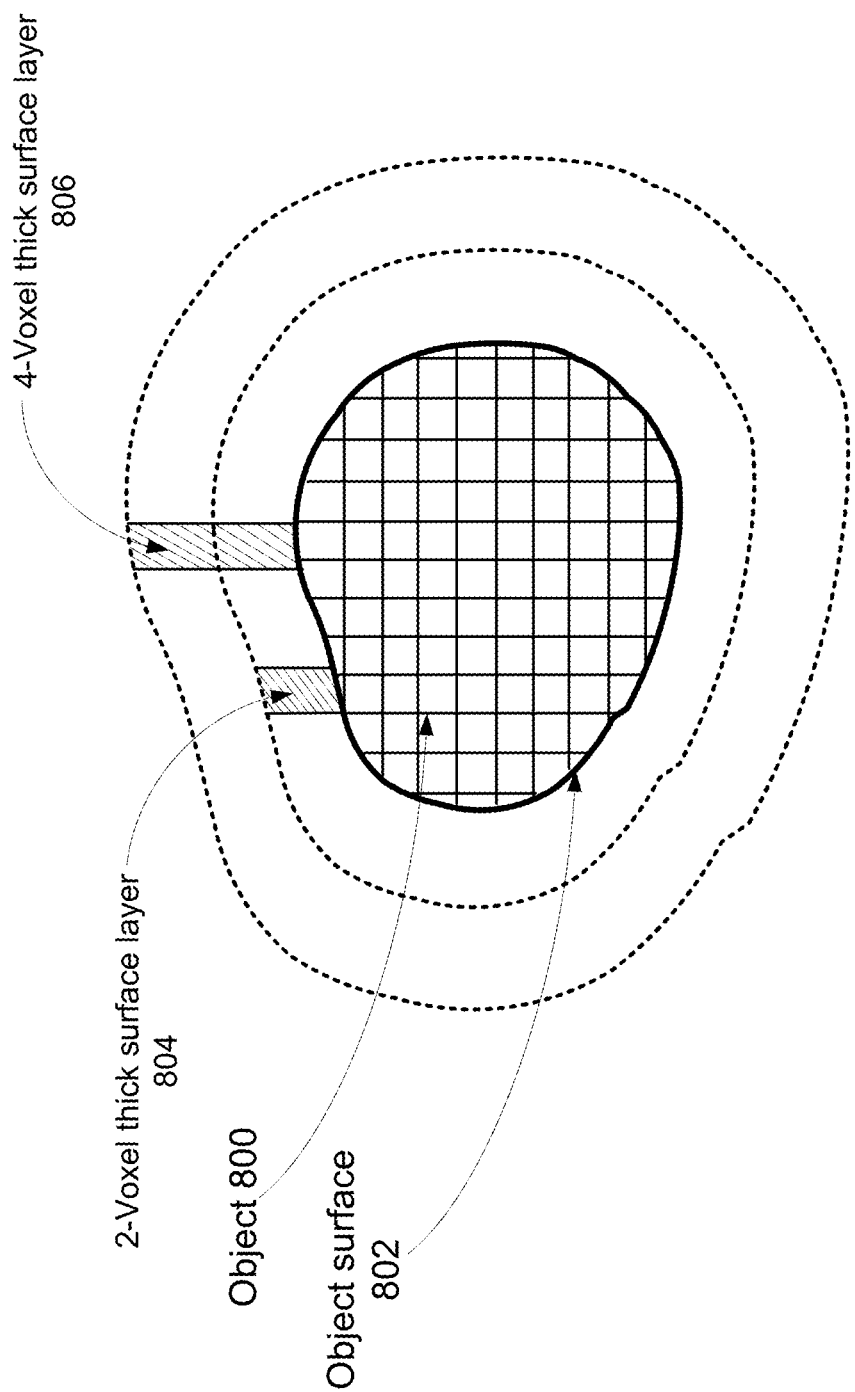
FIG. 8 illustrates an example of a detected object from a reconstructed volume showing surface voxel layers.

FIG. 8 illustrates an example of a detected object 800 from a reconstructed volume showing surface voxel layers. As can be seen in FIG. 8, object 800 is partitioned into equal size voxels. To grow object 800 a 2-voxel thick surface layer 804 can be added just outside the object surface 802 and adjacent to the surface voxels of object 800. Similarly, a 4-voxel thick surface layer 806 can be added just outside the object surface 802 and adjacent to the surface voxels of object 800. These additional layer of voxels are used to extract object features 14 and 15 below.

14. BoundaryLayerAvg2:

A BoundaryLayerAvg2 metric computes the average intensity value of a 2-voxel thick layer just above the object surface and adjacent to the object surface voxels. The metric may be computed as:

BoundaryLayerAvg2=$\Sigma_{i=1}^{M} I_i/M$, where M is the total number of voxels in the 2-voxel thick layer, and is the intensity of each voxel in the 2-voxel thick layer.

15. BoundaryLayerAvg4:

A BoundaryLayerAvg4 metric computes the average intensity value of a 4-voxel thick layer just above the object surface and adjacent to the object surface voxels. The metric may be computed as:

BoundaryLayerAvg4=$\Sigma_{i=1}^{M} I_i/M$, where M is the total number of voxels in the 4-voxel thick layer, and is the intensity of each voxel in the 4-voxel thick layer.

16. ObjectGradient:

An ObjectGradient metric is computed by first computing the derivative gradients in the x, y and z directions and then computing the magnitude of the gradients in all the voxels of the object. The magnitudes are then summed and divided by the total number of voxels in the object. The metric may be computed as:

ObjectGradient=$\Sigma_{i=1}^{N} \sqrt{(xgrad_i)^2+(ygrad_i)^2+(zgrad_i)^2}/N$, where N is the count of all the voxels in the object, and xgrad, ygrad, zgrad are sum of gradients in x, y, z directions in all the voxels in the object.

17. ObjectGradient2:

An ObjectGradient2 metric is computed by first computing the derivative gradients of the voxels in the 2-layer boundary adjacent to the surface of the object (i.e., the first two layers of voxels from the object surface) in the x, y and z directions and then computing the magnitude of the gradients in all the 2-layer boundary voxels of the object. The magnitudes are then summed and divided by the total number of voxels in the 2-adjacent layers in the object. The metric may be computed as:

ObjectGradient2=$\Sigma_{i=1}^{N} \sqrt{(xgrad_i)^2+(ygrad_i)^2+(zgrad_i)^2}/N$, where N is the count of all the voxels in the 2-layer boundary of the object, and xgrad, ygrad, zgrad are sum of gradients in x, y, z directions in the 2-layer boundary of the object.

18. ObjectGradient4:

An ObjectGradient4 metric is computed by first computing the derivative gradients of the voxels in the 4-layer boundary adjacent to the surface of the object (i.e., the first four layers of voxels from the object surface) in the x, y and z directions and then computing the magnitude of the gradients in all the 4-layer boundary voxels of the object. The magnitudes are then summed and divided by the total number of voxels in the 4-adjacent layers in the object. The metric may be computed as:

ObjectGradient4=$\Sigma_{i=1}^{N} \sqrt{(xgrad_i)^2+(ygrad_i)^2+(zgrad_i)^2}/N$, where N is the count of all the voxels in the 4-layer boundary of the object, and xgrad, ygrad, zgrad are sum of gradients in x, y, z directions in the 4-layer boundary around the object.

19. Compactness:

The compactness metric is computed as the ratio of the surface voxels (which is a count of all the voxels that form the surface of the object) and the total voxels (which is the count of all the voxels in the object). The metric may be computed as:

Compactness=Surface Voxels/Total Voxels.

20. Energy:

The Energy metric is the sum of the product of the difference between the intensity value of each voxel and the intensity value of the voxel at the center of mass and its distance from the center of mass of the object. The metric may be computed as:

Energy=$\Sigma_{i=1}^{N}((I_i-I_c)^2 * \sqrt{(x_c-x_i)^2+(y_c-y_i)^2+(z_c-z_i)^2})$, where, N is the count of all the voxels in the object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

21. PoCAEnergy:

The PoCAEnergy metric is the sum of the product of the difference between the PoCA value of each voxel and the PoCA value at the center of mass and its distance from the center of mass of the object. The metric may be computed as:

PoCAEnergy=$\Sigma_{i=1}^{N}((PoCA\_Value_i-PoCA\_Value_c)^2 * \sqrt{(x_c-x_i)^2+(y_c-y_i)^2+(z_c-z_i)^2})$, where, N is the count of all the voxels in the object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

22. SumPThetaEnergy:

The SumPThetaEnergy metric is the sum of the product of the difference between the sum of ptheta value of each voxel and the voxel at the center of mass and its distance from the center of mass of the object. The metric may be computed as:

SumPThetaEnergy=$\Sigma_{i=1}^{N}((SumPTheta_i-SumPTheta_c)^{2} * \sqrt{(x_c-x_i)^2+(y_c-y_i)^2+(z_c-z_i)^2})$, where, N is the count of all the voxels in the object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

23. Entropy:

The entropy metric is a measure of uncertainty in the object. To obtain the entropy value, the probability density function P is computed from the histogram H of the intensity values of voxels in the object. The metric may be computed as:

$$\text{Entropy} = -\Sigma_{i=1}^{N}(P_i * \log_2 P_i),$$

Where, probability $P_i = H_i/\Sigma_{k=1}^{N} H_k$, i and k are indices of the histogram H.

24. SpikeEnergy:

The SpikeEnergy metric is the sum of the squares of the difference between the intensity value of a given voxel and the mean intensity value of all voxels in the identified object, but only if the intensity value of the given voxel exceeds the mean intensity value for the identified object. The metric may be computed as:

$$\text{SpikeEnergy} = \Sigma_{i=1}^{M}(I_i-\mu)^2, \text{ if } (I_i-\mu) > 0,$$

wherein $\mu$ is the mean intensity value for the object.

25. SurfaceIntensity:

Of all the voxels that are connected to each other to form an object, the surface voxels are identified as the voxels that are connected to the object on at least one side and connected to the outside of the object on at least one side. The SurfaceIntensity metric measures the intensities of all the surface voxels:

$$\text{SurfaceIntensity} = \Sigma_{i=1}^{M} S_i,$$

where M is the count of all the voxels in the surface of object and S are the voxels that form the surface of the object.

26. IntegFullIntensity:

The IntegFullIntensity metric is obtained by summing or integrating the intensity values of all the voxels that are part of the object. The metric may be computed as:

$$\text{IntegFullIntensity} = \Sigma_{i=1}^{N} I_i,$$

where N is the count of all the voxels in the object.

27. InnerIntegIntensity:

The InnerIntegIntensity metric is the sum of the intensities of the voxels that form the object but excluding the intensities of the voxels on the surface of the object. The metric may be computed as:

$$\text{InnerIntegIntensity} = \Sigma_{i=1}^{N} I_i - \Sigma_{i=1}^{M} S_j,$$

where N is the count of all the voxels in the object, M is the count of the voxels on the surface of the object, I is intensity of each voxel of the object, and S is the intensity of each surface voxel of the object.

28. IntegIntensityRatio:

The IntegIntensityRatio metric is the ratio of the average surface intensity value computed as the sum of all the intensities of the surface voxels divided by the total surface voxels and the average of all the intensities of all the voxels in the object. The metric may be computed as:

$$\text{IntegIntensityRatio} = \text{SurfaceIntensity}/(\text{Number of surface voxels} \times \text{AverageIntensity}).$$

29. Moments:

To compute the moments metric, we first compute the center of mass of each of the voxels connected to each other and identified as $x_c$, $y_c$, $z_c$ coordinates. The moments for the object are then computed by the sum of squares of the translations of each voxel from the center of mass times the intensity of that voxel.

$$\text{Moments} = \Sigma_{i=1}^{N}(I_i * \sqrt{(x_c-x_i)^2 + (y_c-y_i)^2 + (z_c-z_i)^2}),$$

where $I_i$ is the intensity value of the voxel $(x_i, y_i, z_i)$, $x_c$ is the x-coordinate of the center of mass, $y_c$ is the y-coordinate of the center of mass, and $z_c$ is the z-coordinate of the center of mass.

Additional Implementations: Image Based Object Identification in Muon Tomography The detect the transport of nuclear and conventional Weapons of Mass Destruction and other bulk contraband, the disclosed Multi-Mode Passive Detection System (MMPDS) can be implemented to image the contents of cargo containers and vehicles without applying ionizing radiation. A reconstructed image volume of the detector space is generated from the detector measurements that define the trajectory of each muon that enters and exits through the detector. The track deflections are used to estimate these locations of scatter called points of closest approach of PoCA's and along with other measurement data are used to reconstruct the 3-D volume that is imaged. Since the number of muons is limited, the object voxels are sparse and somewhat fragmented, approaches to analyze the 3-D volume to fine the objects by aggregating the scatter points without introducing shape biases are difficult. The disclosed technology includes methods that address this problem by looking at the problem from a computer vision standpoint. Each voxel is associated with an intensity value, track and other muon measurements. By segmenting the voxels to find candidate objects and then using filter operators, it is possible to combine the candidate object voxels together as part of the same object and extract features for identification and eventual classification. The disclosed technique is very effective in finding the objects using image volume data and measurements from simulations, and actual data obtained using the disclosed 24'×72' MMPDS and data from other detectors including 6'×8' package scanner.

Introduction: Threats of potentially catastrophic acts of nuclear terrorism and state sponsored nuclear sabotage continue to grow. To detect the transport of nuclear and conventional weapons of mass destruction (WMD's) and other bulk contraband, the disclosed Multi-Mode Passive Detection System (MMPDS), capable of imaging the contents of cargo containers and vehicles without applying ionizing radiation.

A key driver behind MMPDS is a technology called cosmic-ray tomography that uses the interaction of muons and electrons in the cosmic ray incident at the earth's surface. Muons are naturally occurring cosmic ray-induced particles that continuously rain down from the Earth's upper atmosphere, harmlessly penetrating everything they touch. In addition to muons, cosmic-ray particles also include electrons (and positrons). In combination with gamma radiation detection algorithms, MMPDS can effectively scan a typical 40-foot shipping container, providing accurate and safe scanning while facilitating the flow of commerce. The MMPDS technology produces no ionizing radiation, meaning it is completely safe for people, animals, plants, and food.

A reconstructed 3D image volume of the detector space is generated from the measurement and trajectory of each muon that enters and exits through the detector space. About 1 muon/cm²/minute is incident at sea level on the earth surface. As muons move through dense high-Z objects (e.g., Special Nuclear Material [SNM] such as highly enriched uranium or plutonium) or other materials that could be used to shield nuclear threat material (e.g., lead or tungsten), our algorithms recognize the high muon scattering and apply special processing to identify and locate any potential threat. In addition to muon tomography, the MMPDS has gamma detection capability, enabling it to identify the intensity and presence of gamma-producing material. This gamma detection capability combined with muon tomography enables for more robust detection of any potential threat.

Figure 9:
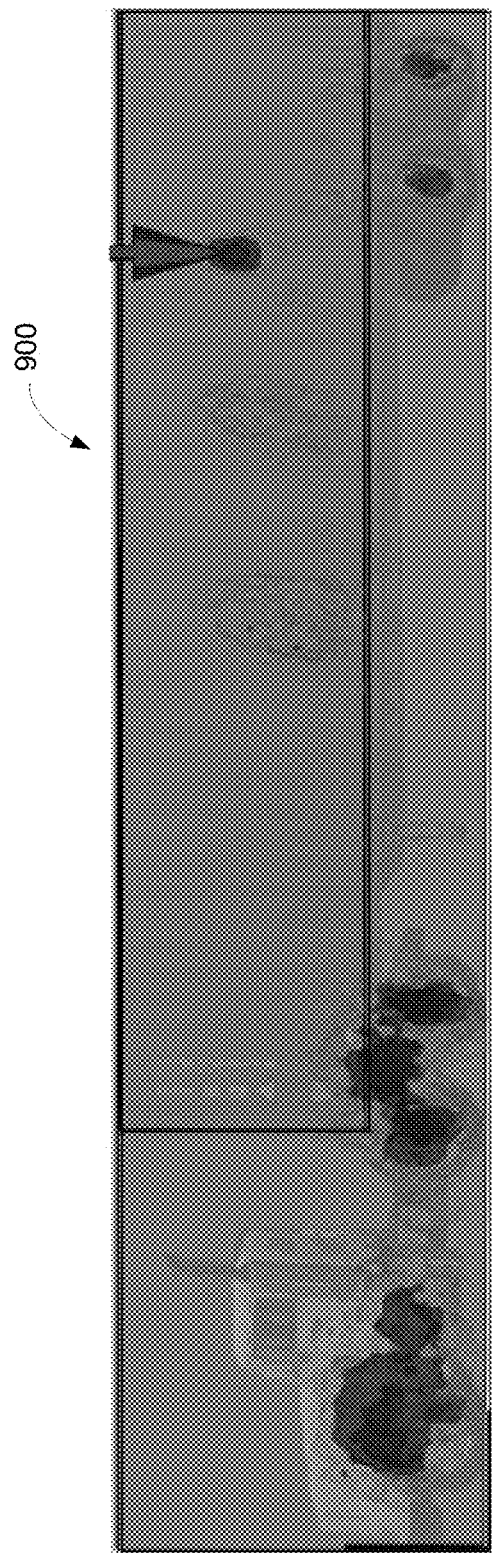
FIG. 9 shows an exemplary truck image overlaid with tomographic reconstruction showing nuclear material.

FIG. 9 shows an exemplary truck image 900 overlaid with tomographic reconstruction showing nuclear material.

Figure 10:
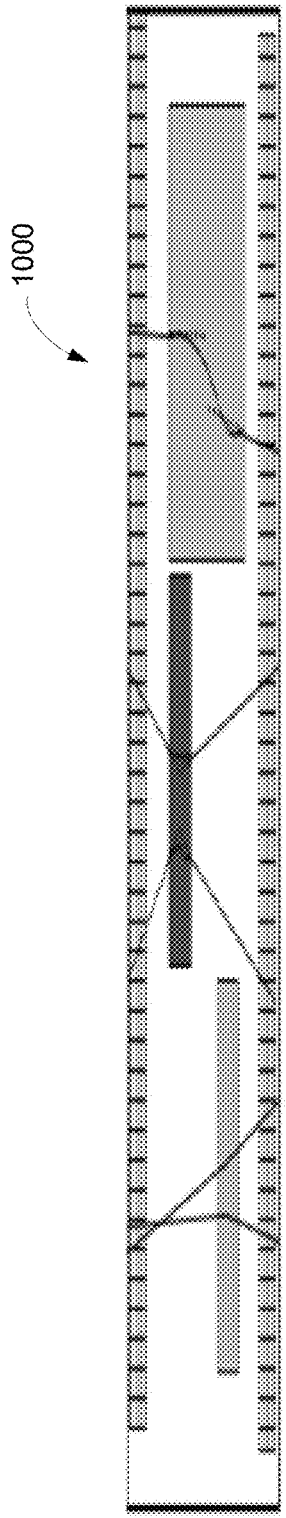
FIG. 10 is a diagram showing muon track entering, exiting the detector and scattering in high-Z materials.

FIG. 10 is a diagram 1000 showing muon track entering, exiting the detector and scattering in high-Z materials.

As muons enter the detector they are tracked at their point of entry and at the point of exit. This helps to estimate various parameters about this muon and its path. The material through which it traversed is estimated and the deflections that occurred are measured. After a certain critical amount of time when enough muons have passed through the system and detected, the detector volume can be reconstructed into voxels that are associated with an intensity value and other properties. This volume can be analyzed to find all the objects within the volume and then identify which ones are threats. Additionally, electrons in cosmic rays also scatter even with low-Z material such as contraband and can be detected to identify these materials.

Segmentation: One of the challenges in detecting the object of interest is first to find the relevant set of the objects in the cargo volume reconstruction. This is often very difficult due to the noise in the reconstructed volume from clutter due to other kinds of objects in the container as well as other secondary effects. The cargo container itself introduces noise. The disclosed technology solves this problem by using different techniques. Once the objects are found, the features of the objects can be formulated and classified based on its properties.

The first set of images show the challenges and resolution while detecting the depleted uranium object in harmless clutter but that might be used to evade detection. The pictures below show the clutter as pallets of paper but this is has also been tested on various other kinds of clutter that might be used to evade detection.

Figure 11:
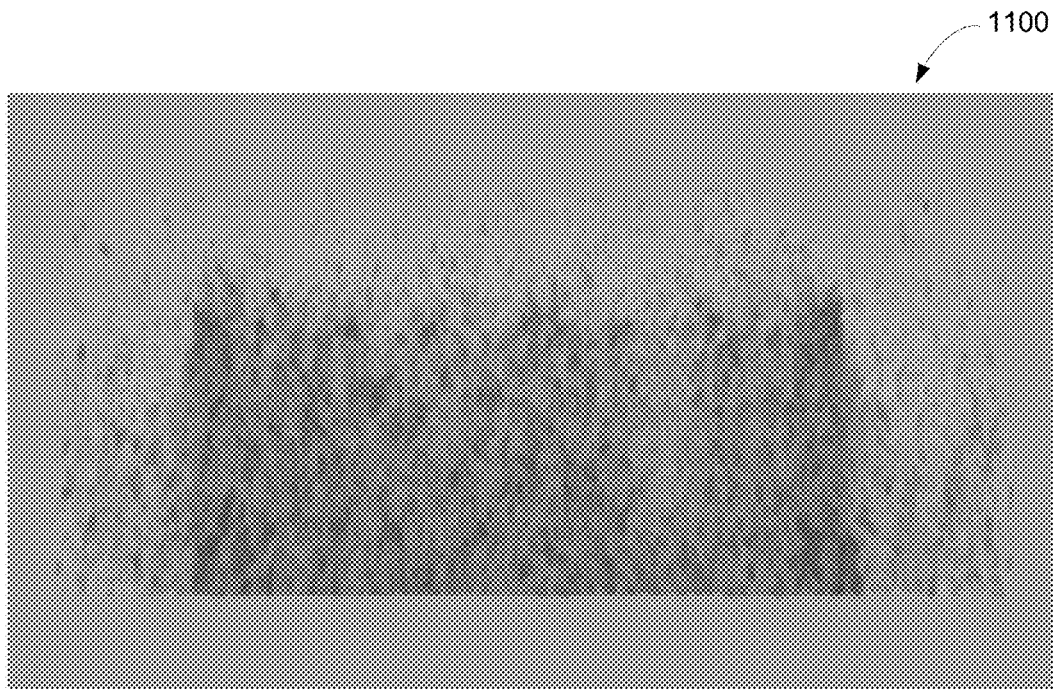
FIG. 11 is an image showing a volume of a cargo container from the side.

The Reconstruction: FIG. 11 is an image 1100 showing a volume of a cargo container from the side. While the container is visible as a whole, the objects are not easy to identify. Due to the sparseness of the muons themselves, the objects are difficult to locate in this environment. Typical methods have looked at the track information data to estimate points of deflection and predict where the object exists. Using special 3-D reconstruction methods the volume can be reconstructed from track data. But finding the object is not so easy in this noise and the object locations themselves are somewhat fragmented. It is difficult to combine these fragmented pieces together and estimate the extents of the object without introducing shape constraints or biases into the problem.

In FIG. 11, there is no truck or container wheels with just the container itself placed on the detector. In this container the rear eight pallets of paper—two pallets in the front stacked side to side, four stacked together in the middle and then two pallets at the back. On top of the middle four pallets of paper, there is a mass of depleted uranium. In the picture in FIG. 11, the cargo that appears as a reddish region seems very noisy with no definition of the pallets of paper or the depleted uranium object on top of the pallet. The image 1100 shows the side profile of a Cargo Volume. The Container with Paper Pallets and Depleted Uranium are in the image but hard to see visually.

Figure 12:
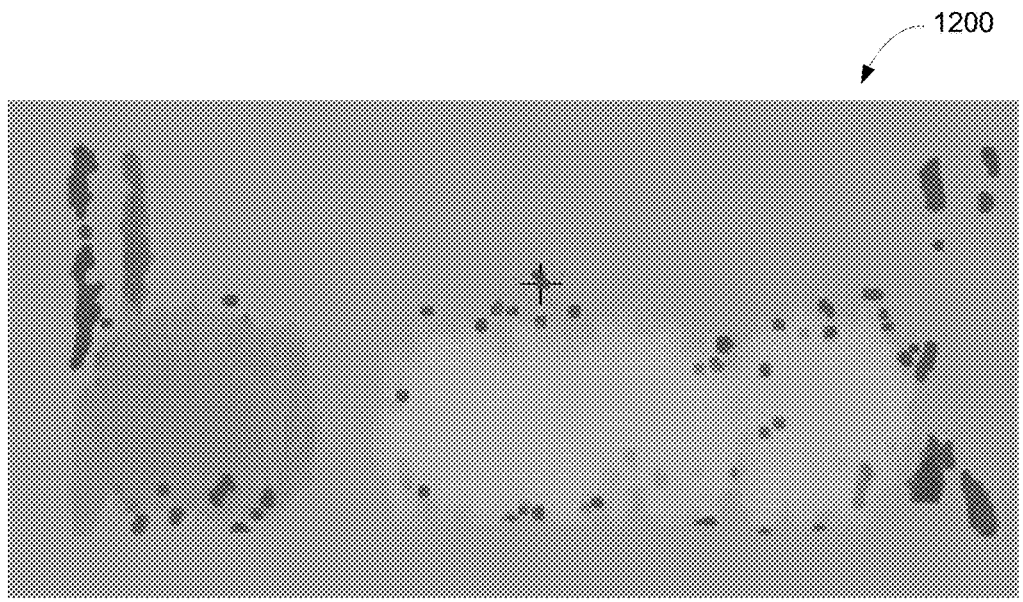
FIG. 12 is an image showing the side profile of a cargo volume after segmenting and filtering the volume.

The disclosed technology addresses this problem from a 3-D computer vision standpoint by looking at the volume as a collection of voxels—each associated with intensities and other measured or computed properties. Using patented techniques to automatically segment and filter the volumetric data we can isolate the voxels that belong to the object or objects among other structures and clutter that might be present in the data. The objects are then analyzed by looking at the properties of each voxel and the obvious uninteresting voxels or other known artifacts are discarded. The remaining voxels are a relatively small set of objects. FIG. 12 is an image 1200 showing the side profile of a cargo volume after segmenting and filtering the volume. The paper pallets and Depleted Uranium (marked by a +) can be seen.

The picture 1200 in FIG. 12 shows a volume after the segmentation and filtering of image volume data. The colors in this image are just labels that identify the object and are not reflective of density or other properties of the object themselves—although that information is utilized internally.

The paper pallets are now visible in the rest of the container and you can see the gaps between the pallets and the depleted uranium (colored a shade of magenta) sitting on top of it—in this case marked with a cross-hair.

Using the same paper pallets we tried to hide the depleted uranium in between the paper pallets. A small amount depleted uranium is placed 3 feet from the ground. The DU can be seen distinctly in the scene. The following figures represent the reconstructed image and segmented images. These are of-course colored artificially to make the objects more visible.

Figure 13B:
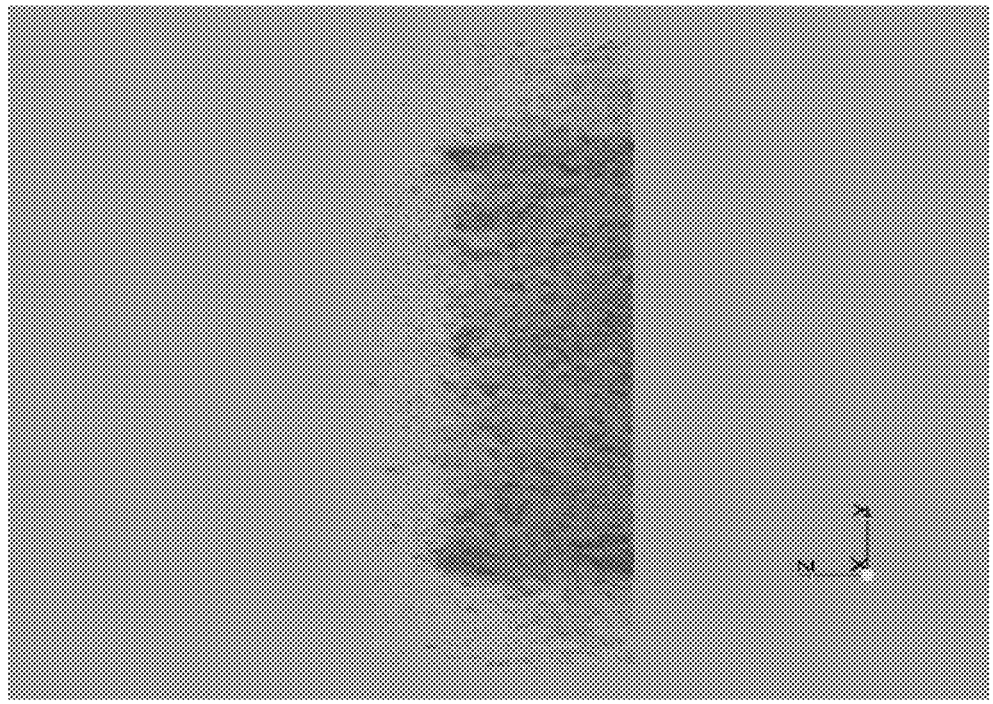
FIGS. 13A and 13B show the top view and side view of the scene respectively.
Figure 13A:
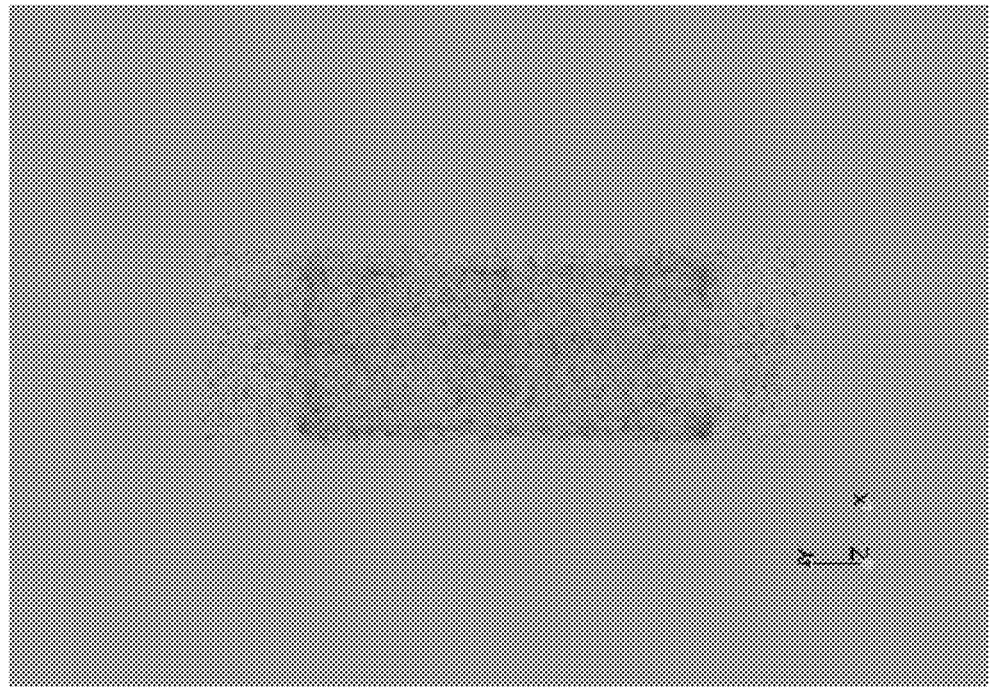

FIGS. 13A and 13B show the top view 1300 and side view 1310 of the scene respectively. There are 6 paper pallets and a DU within the pallets. It is difficult to see the DU or the paper pallets.

Figure 14B:
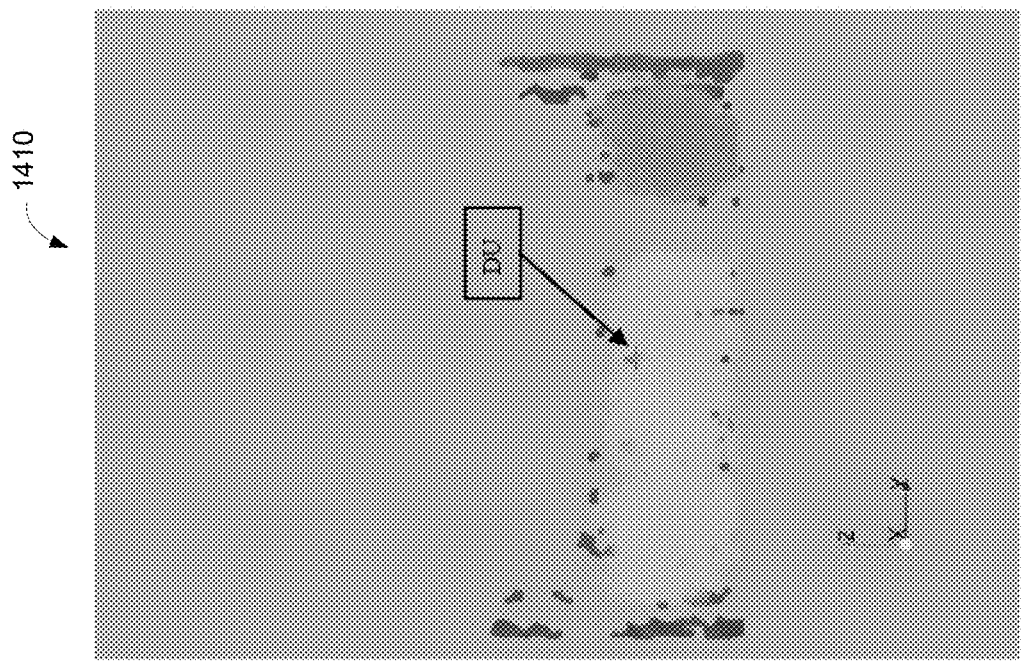
FIGS. 14A and 14B show the top view and side view of the segmented scene.
Figure 14A:
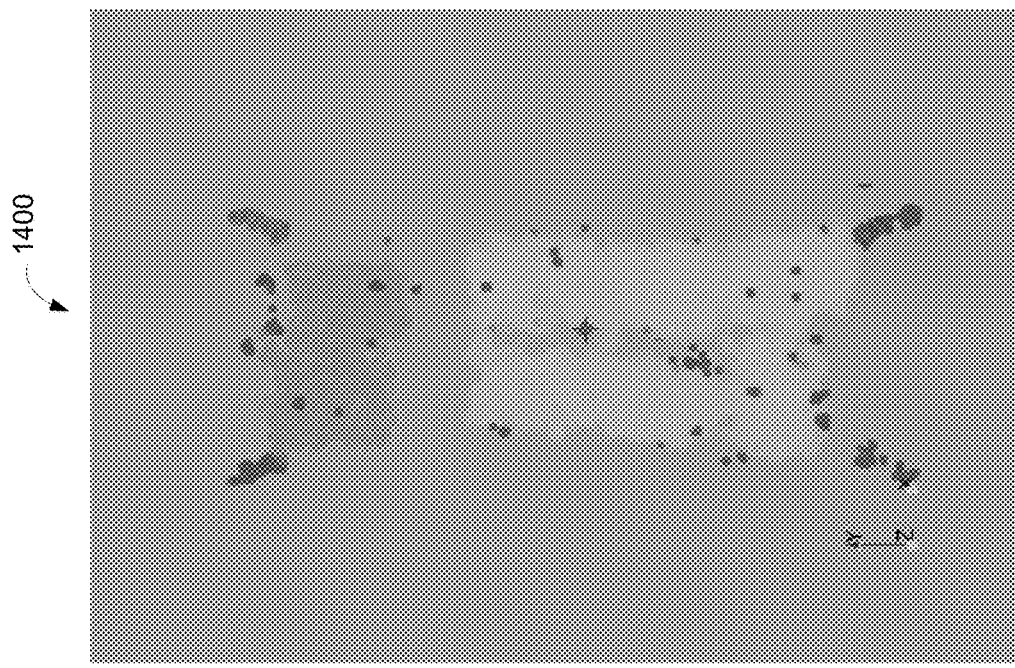

FIGS. 14A and 14B show the top view 1400 and side view 1410 of the segmented scene. There are 6 paper pallets and a DU within the pallets. You can see the DU and the paper pallets.

In other instances where two depleted uranium objects of slightly differing mass are placed on the floor at different locations within the cargo container but on a wooden box and without the paper pallets, detection of each object at the correct location can be shown. By looking at properties of the individual masses it is possible to predict the material of the mass and then consider it as an object if it is of interest to us.

Figure 15B:
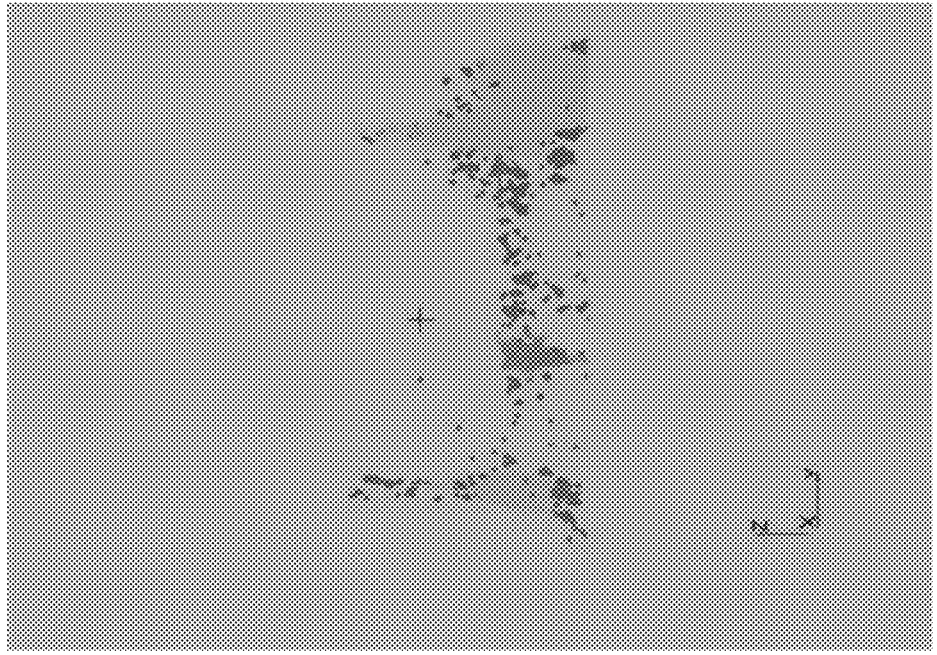
FIGS. 15A and 15B show that the 2 different DU objects are placed without any clutter in the scene but on top of a wooden box a distance from the floor.
Figure 15A:
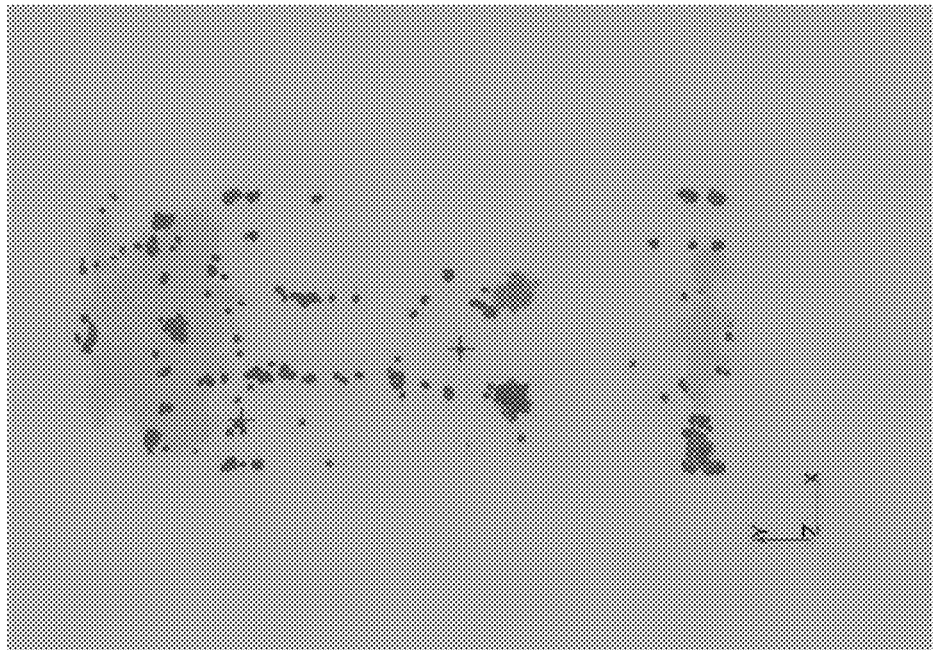

FIGS. 15A and 15B show that the 2 different DU objects are placed without any clutter in the scene but on top of a wooden box a distance from the floor. Here they are visible DU both from the top view 1500 and the side view 1510 and marked by crosses.

Figure 16:
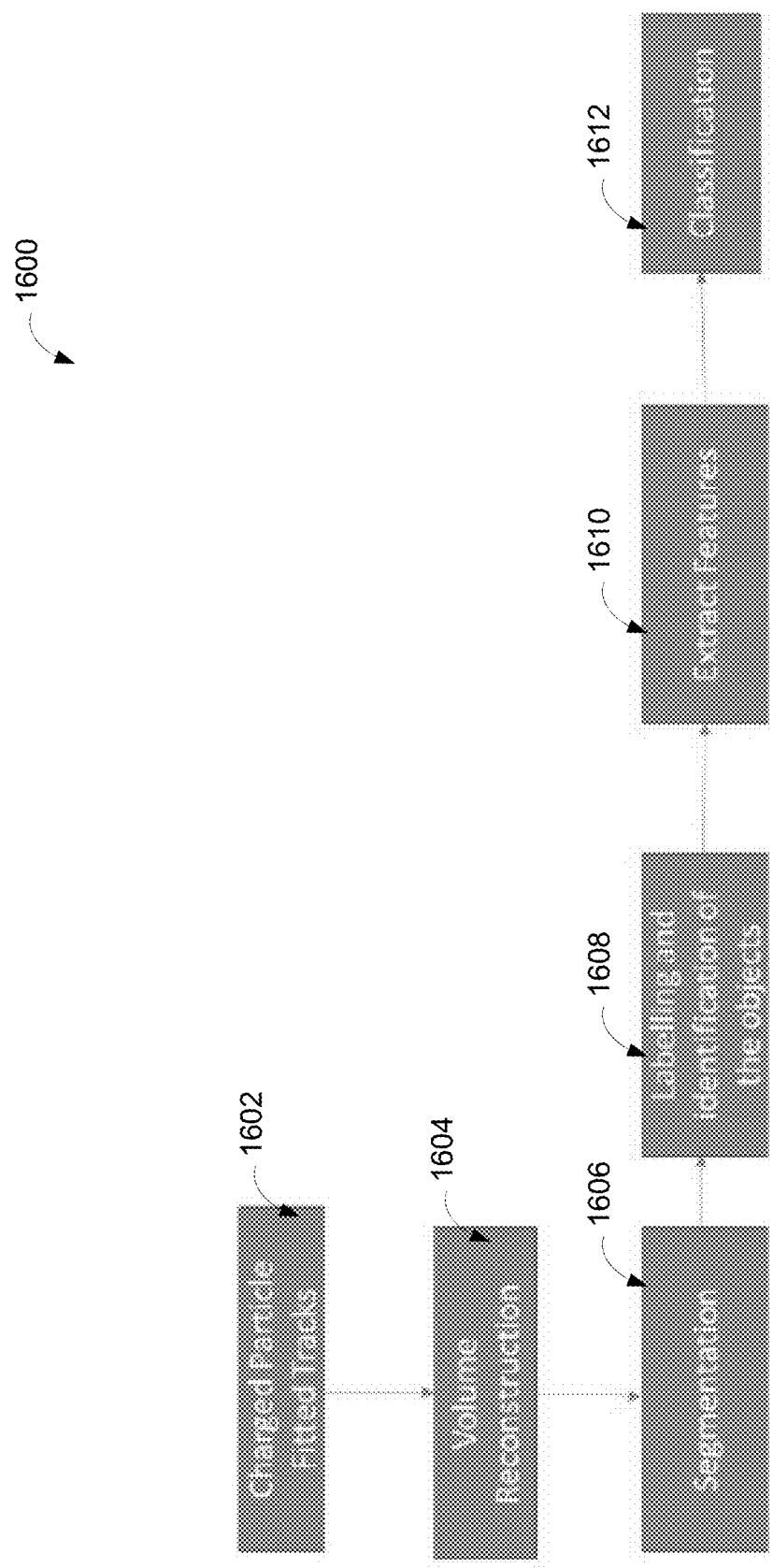
FIG. 16 is a process flow diagram showing a flow of data from received charged particles to the segmentation and eventual classification of data.

FIG. 16 is a process flow diagram 1600 showing a flow of data from received charged particles to the segmentation and eventual classification of data. The flow chart below in FIG. 16 shows the overall flow of the process that is used to detect and identify the objects in the cargo container. The method is also very similar in the case of the package scanner, although some changes are made to handle changes due to the geometry of the detector. The charged particles are tracked (1602) as they enter and exit the inspection volume as mentioned above and used to reconstruct the volume (1604) using several possible methods. The reconstructed volumes are then analyzed by filtering and adaptively segmenting the volume (1606). This is then analyzed further to identify all the objects that are not noise. For example, objects are labeled and identified (1608). Clutter is also identified as object. Features are extracted from the identified objects (1610). The properties of these objects are used to determine relevance of the object, such as used in classifying the objects (1612).

While the pictures above show data acquired under cargo conditions we easily apply this method to MMPDS based package scanners as well. We show detection under various configurations including 6'×8' package scanner, the 24'×36' cargo scanner at our facilities in Poway, Calif. and 24'×72' cargo container detector at Freeport, Bahamas.

On the 6'×8' DSIC portable package scanner, the package is carried using a conveyor belt and loaded into the system for inspection. While the package is expected to be on the conveyor, there is enough room to place the package in different parts of the detector. The package is deliberately placed at different positions within the volume so that enough variation in data is obtained. The exact location is needed to be able to characterize the object. By imaging the full inspection volume of the scanner from the charged particle tracks the package/object can be located. In this case we use an image processing/computer vision based technique to filter out the noise and adaptively segment the object from the image volume. Segmentation isolates the candidate voxels that belong to the object. Morphological operators are run on the selected voxels using criteria that are derived from the object properties. Dense objects are the easiest to locate with accuracy and can be characterized easily. Other objects have varying challenges but a large number of known substances can be located and identified. While all of the substances that we wanted to identify were identifiable, here are just a sample of the capabilities. The focus of this the portable scanner is on contraband and explosives but it is fully cable of detecting other objects as well.

In all of the cases, the object in Table 1 was placed inside a brown packaging box on top of a layer of Styrofoam packaging and secured by also placing the Styrofoam packing material around it and the package was sealed. The weights of each package was approximately about the same whenever material was adequately available. The brown box package was loaded from the side of the portable package scanner using a conveyor mechanism. The information regarding the contents of the package was not utilized for the location or segmentation of the object but only for the verification of the detection. In some of the pictures below, the found extents are marked to show what the region looks like. Some of the pictures are left as it is to enable a better a view of the segmented region.

TABLE 1

MATERIALS LIST

| Teflon | Chewing Gum | Nylon | PVC | Tobacco |
|---|---|---|---|---|
| Sugar | SPAM (canned meat) | Sand | Steel | Water |
| Sodium Chloride | Magazines | Tungsten | Aluminum | Ethanol |
| Sodium Chloride | Magazines | Tungsten | Aluminum | Ethanol |
| Sodium Nitrate | Toilet Paper | Acetal (Delrin) | Lead | Methanol |
| Office Paper | Gravel | HDPE | Flour | Isopropyl Alcohol |

Figure 17B:
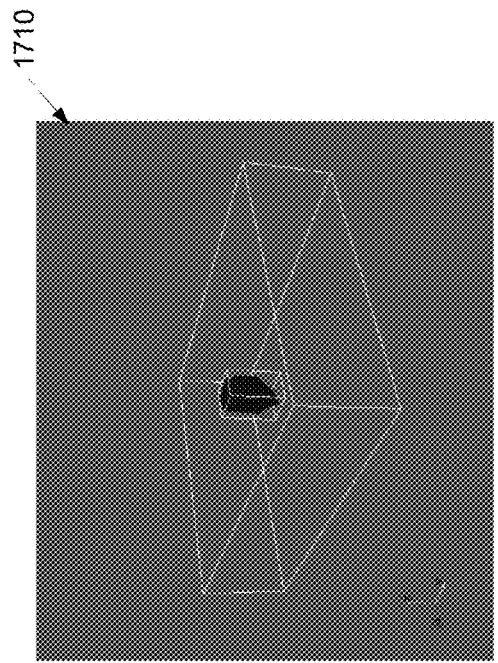
FIG. 17B is an image that shows a canister of water packed inside the brown box and the object bounds.
Figure 17A:
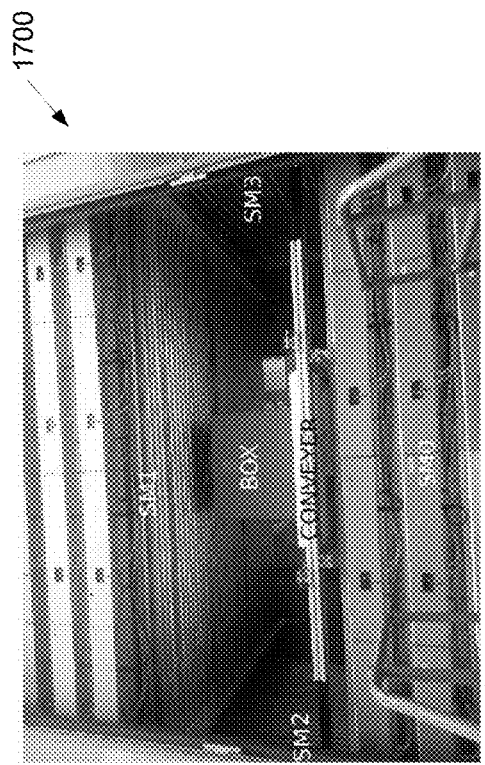
FIG. 17A is an image that shows the detector supermodules (groups of detector modules), conveyor and box.

FIG. 17A is an image 1700 that shows the detector supermodules (groups of detector modules) 1700, conveyor and box. FIG. 17B is an image 1710 that shows a canister of water packed inside the brown box and the object bounds.

Figure 18B:
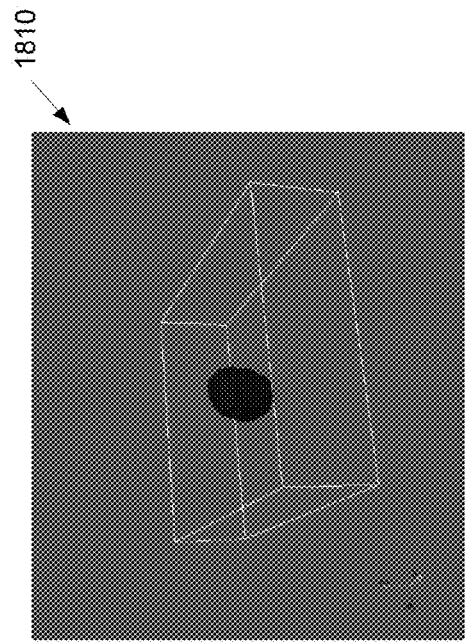
FIG. 18B is a picture that shows the segmented reconstructed image.
Figure 18A:
FIG. 18A is a picture that shows the gum being packed in the cardboard package and imaged.

FIG. 18A is a picture 1800 that shows the gum being packed in the cardboard package and imaged. FIG. 18B is a picture 1810 that shows the segmented reconstructed image.

Figure 19B:
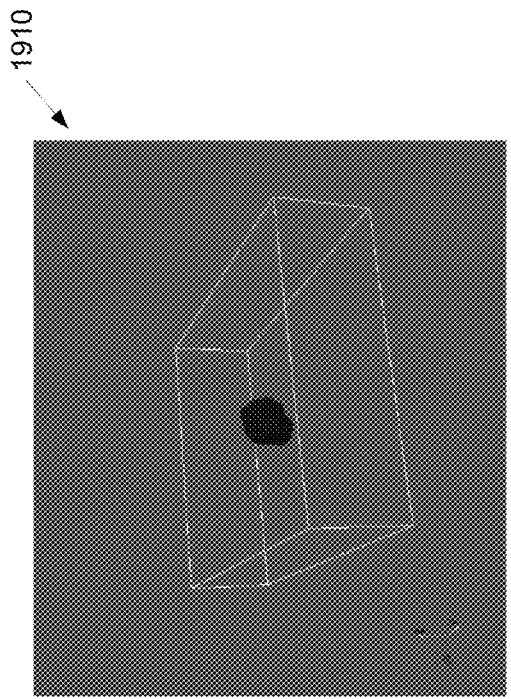
FIG. 19B is an image that shows the segmented reconstructed image on the right.
Figure 19A:
FIG. 19A is a picture that shows the SPAM (a canned meat product) in the cardboard box on the left.

FIG. 19A is a picture 1900 that shows the SPAM (a canned meat product) in the cardboard box on the left. FIG. 19B is an image 1910 that shows the segmented reconstructed image on the right.

Figure 20B:
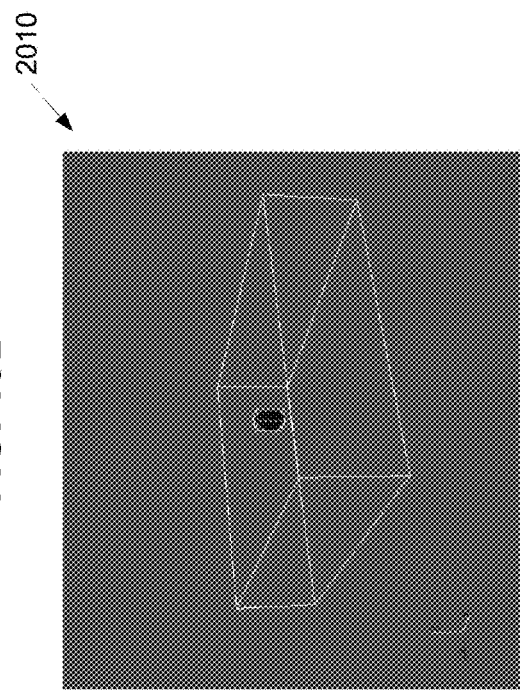
FIG. 20B is an image showing a tungsten cube with Object Bounds.
Figure 20A:
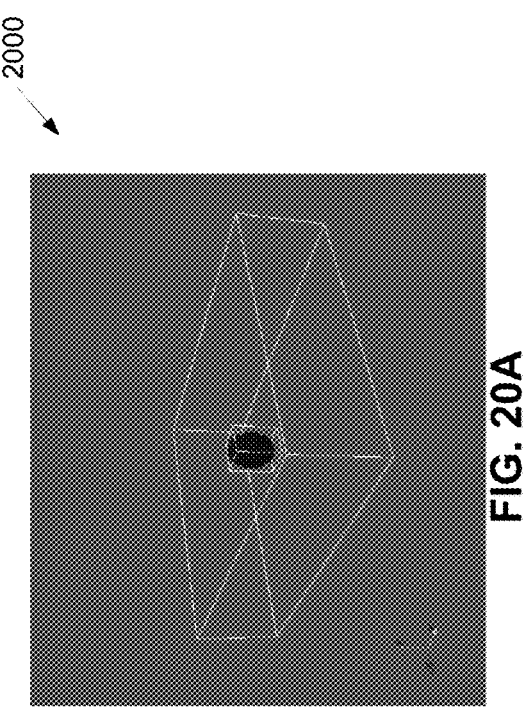
FIG. 20A is a picture showing Delrin or acetal with bounds.

FIG. 20A is a picture 2000 on the left showing Delrin/acetal with bounds. FIG. 20B is an image 2010 on the right showing a tungsten cube with Object Bounds.

Figure 21A:
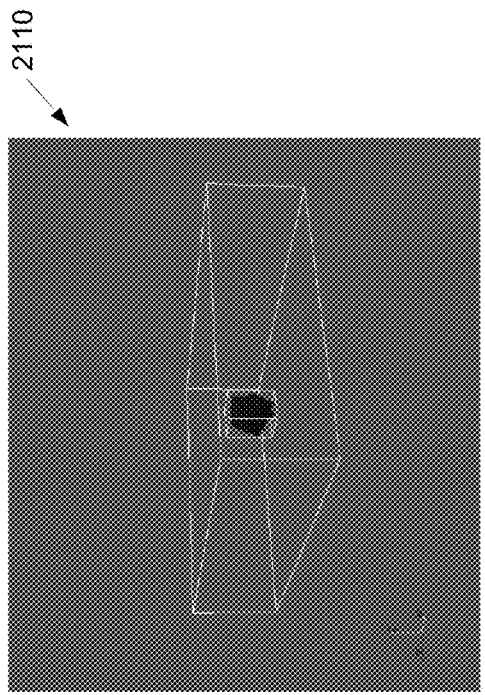
FIG. 21A is a figure showing bottles of whiskey.
Figure 21B:
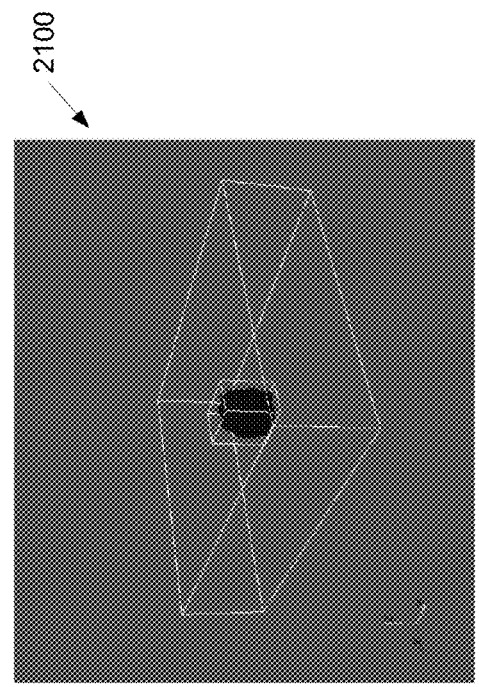
FIG. 21B is an image showing bottles of red wine.

FIG. 21A is a FIG. 2100 on the left showing bottles of whiskey. FIG. 21B is an image 2110 the right showing bottles of red wine. Both FIGS. 21A and 21B show the bounds for the objects.

Figure 22A:
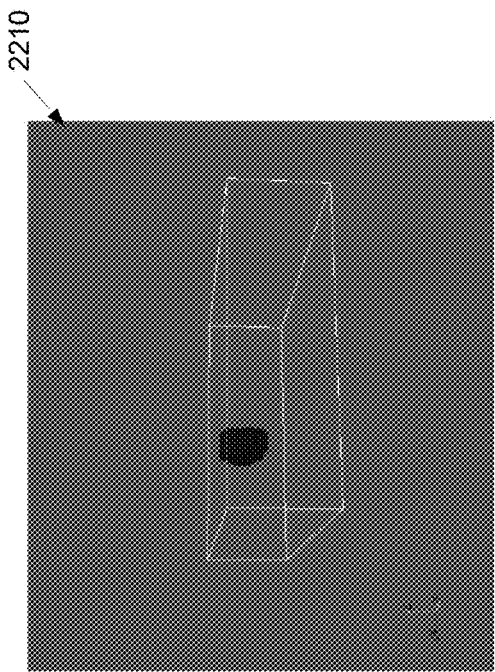
FIG. 22A is an image showing sodium nitrate in the bag placed within a cardboard package.
Figure 22B:
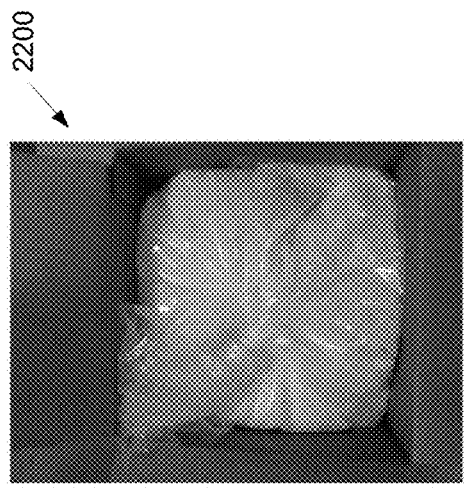
FIG. 22B is the reconstructed image.
Figure 23A:
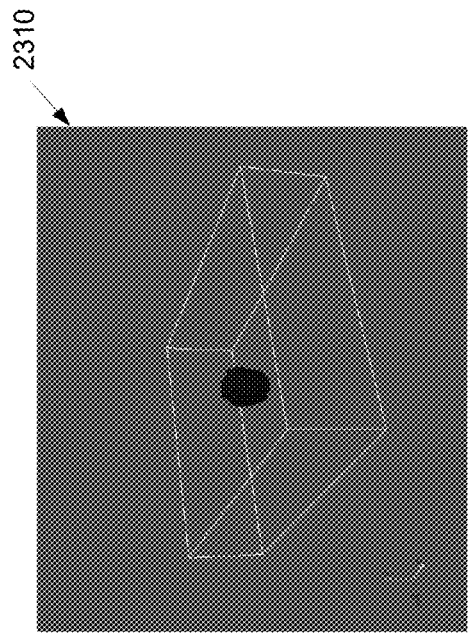
FIG. 23A is a segmented image of office paper.
Figure 23B:
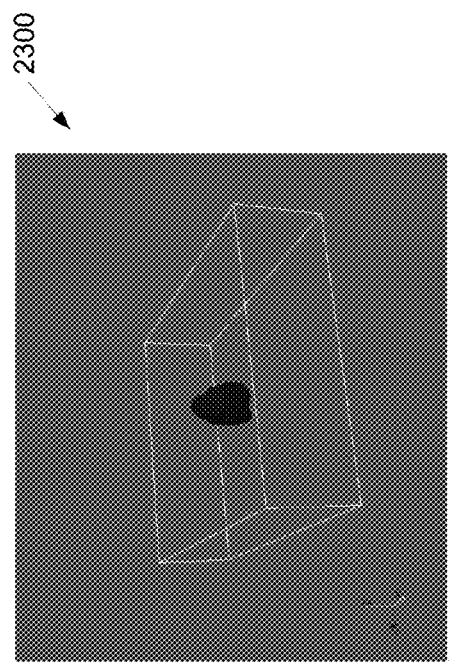
FIG. 23B is a segmented image of a nylon slab.

FIG. 22A is an image 2200 showing sodium nitrate in the bag placed within a cardboard package. FIG. 22B is the reconstructed image 2210. FIG. 23A is a segmented image 2300 of office paper. FIG. 23B is a segmented image 2310 of a nylon slab.

Figure 24A:
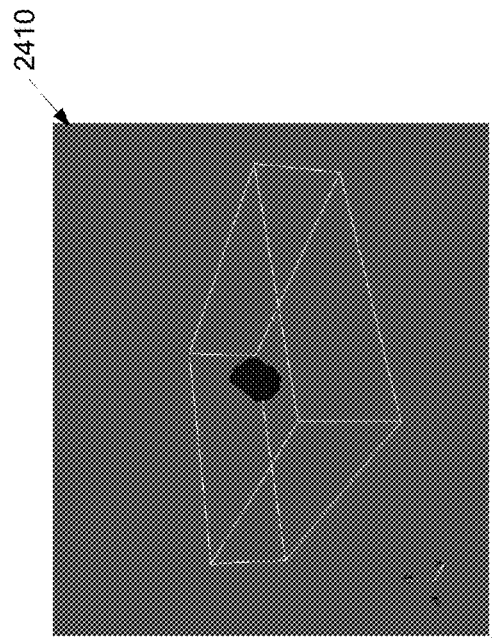
FIG. 24A shows a reconstructed segmented image of a lead slab.
Figure 24B:
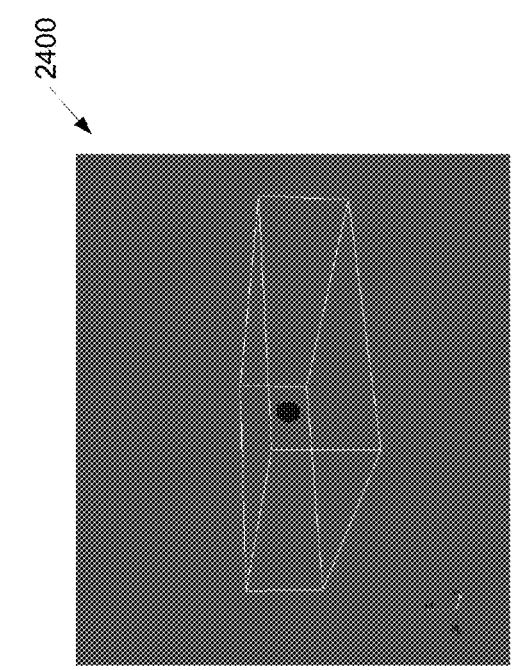
FIG. 24B is a reconstructed segmented image of a container with sugar.

FIG. 24A shows a reconstructed segmented image of a lead slab. FIG. 24B is a reconstructed segmented image of a container with sugar.

Figure 25:
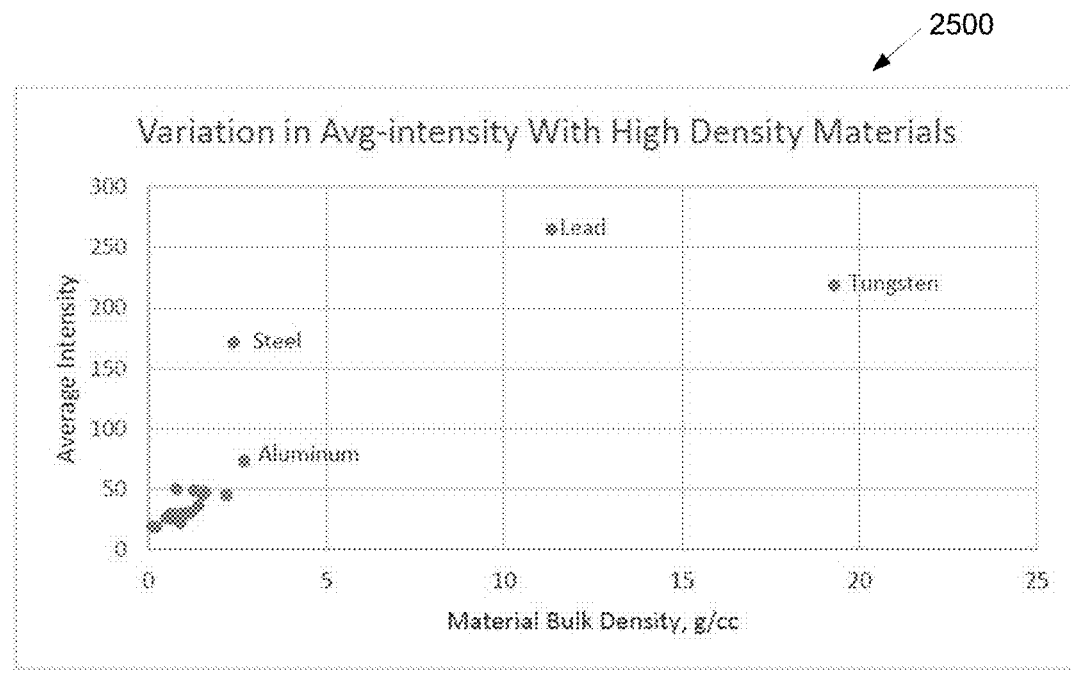
FIG. 25 is a graph showing variation of average intensity with respect to material density for high density materials.
Figure 26:
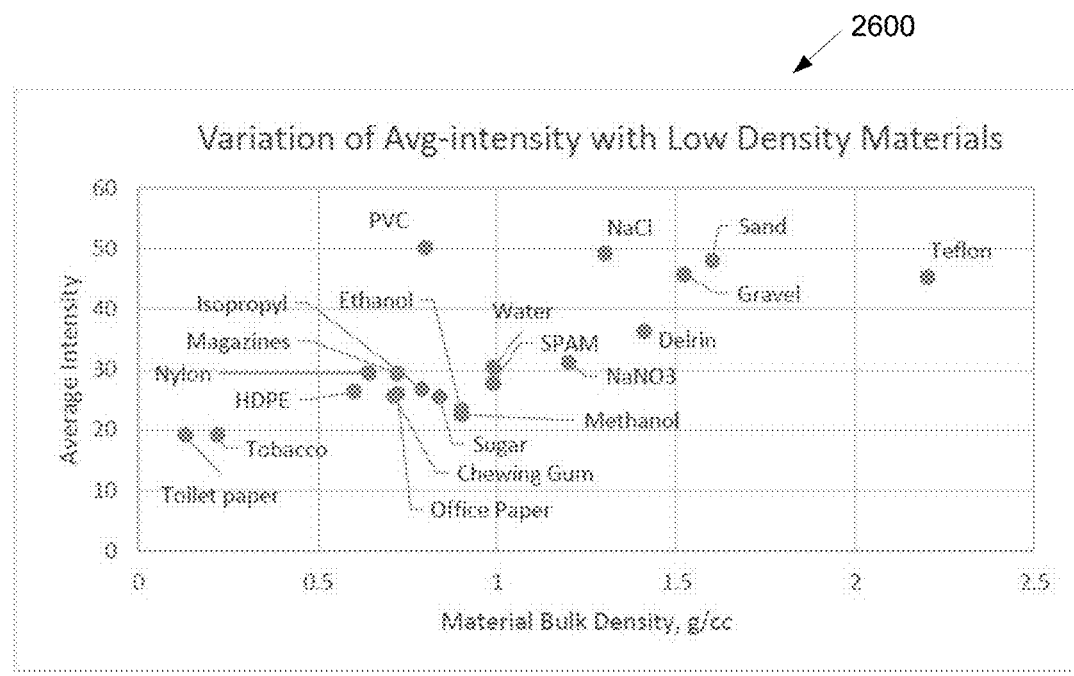
FIG. 26 is a graph showing variation of average intensity with respect to material density for low density materials.

Feature Extraction: Based on segmented voxels, some of the features can be directly measured. One important feature is the average intensity of the object voxels. There are other features that enable us to improve our classification to very high rates but this is one of them. Measurements suggest that data could be significantly classified using this feature as the plots FIGS. 25 and 26 suggest. FIG. 25 is a graph 2500 showing all the data points but only the ones with the higher densities are labeled. FIG. 26 is a graph 2600 showing the lower density materials. The plots show how intensity of the objects increase with density of the object being imaged.

FIG. 25 is a graph 2500 showing variation of average intensity with respect to material density for high density materials. For materials that are solid blocks or liquid, the material bulk density is just the material density. For powder and chunk materials, the material bulk density is significantly lower than the material density.

FIG. 26 is a graph 2600 showing variation of average intensity with respect to material density for low density materials. For materials that are solid blocks or liquid, the material bulk density is just the material density. For powder and chunk materials, the material bulk density is significantly lower than the material density.

Evaluation of Performance: One aspect of the disclosed technology is to segment, locate and measure the features of each object. To compare results appropriate metrics are tracked and the performance estimated. In this example, object location is used by measuring the center of mass of the object and volume by counting the number of voxels segmented for the object. Since the object in box was arbitrarily placed on the conveyor by an operator, there was no actual location to compare with. In order to find the performance of locating the object, the objects are manually located first in the reconstructed image. The locations of the materials/objects were visually estimated from the reconstructed volume and centered manually and the X, Y, Z locations of each object was noted. The same volumes were then used for automatic segmentation, feature extraction and object identification. The automatically segmented objects were identified by consolidating the voxels that belong to the object by generally discarding voxels that are do not fit our definition of an object and computing the center of mass of the selected voxels. The center of mass of each visually estimated material is compared to the automatic detection and the plots are shown following figures.

Figure 27:
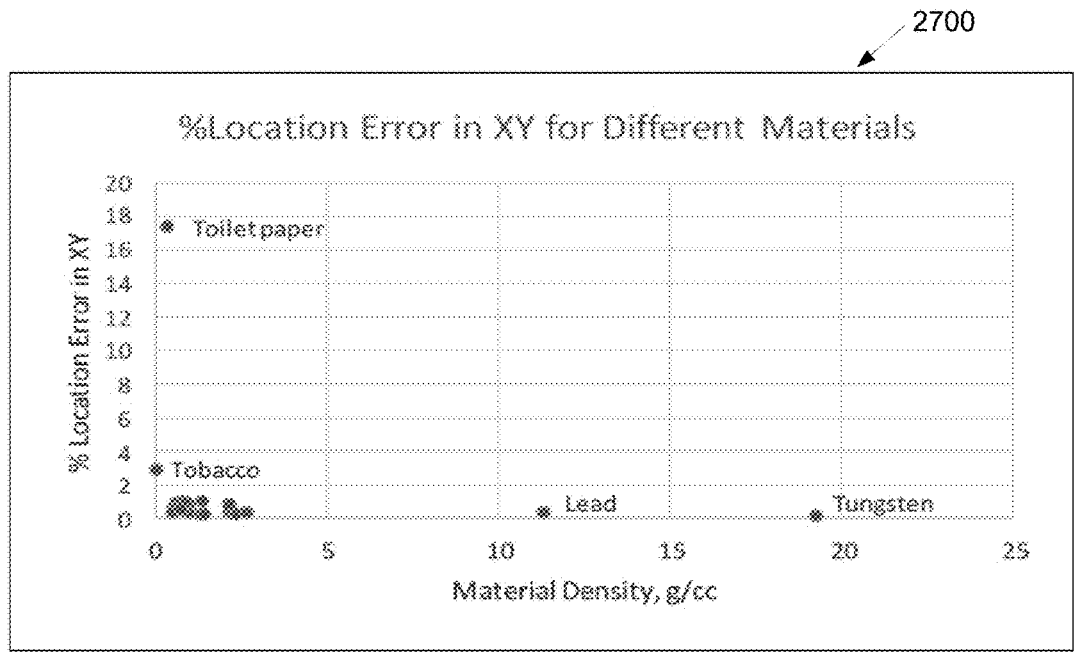
FIG. 27 shows a percentage error in detection of the XY location of the object.
Figure 28:
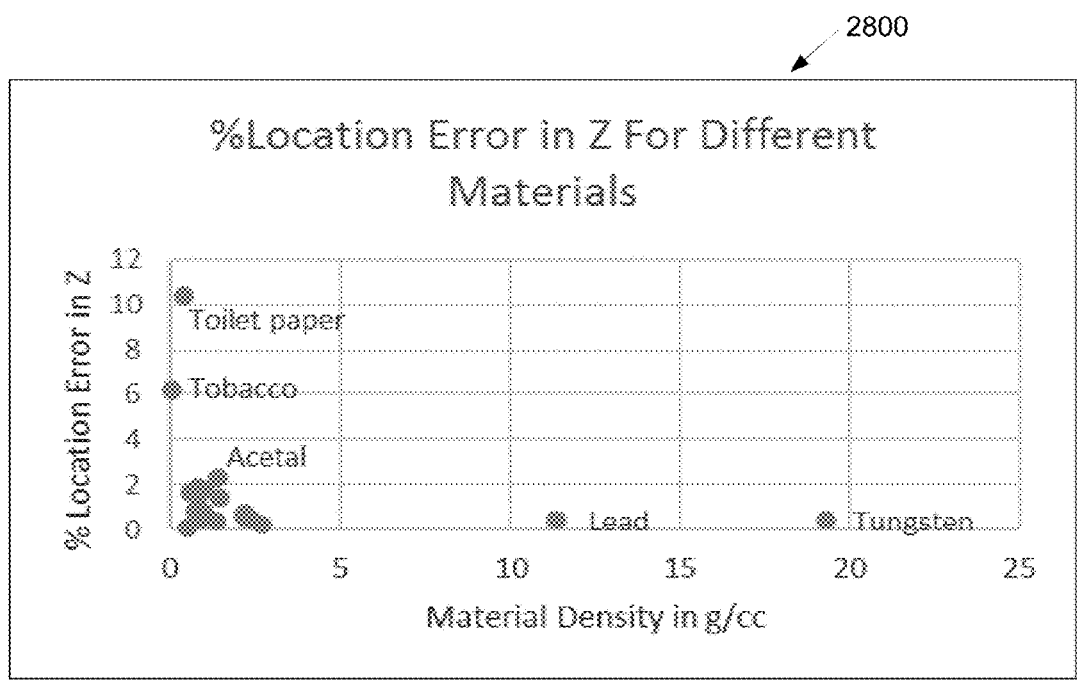
FIG. 28 is a plot showing % error in location in Z (thickness) found automatically with respect to manual inspection.
Figure 29:
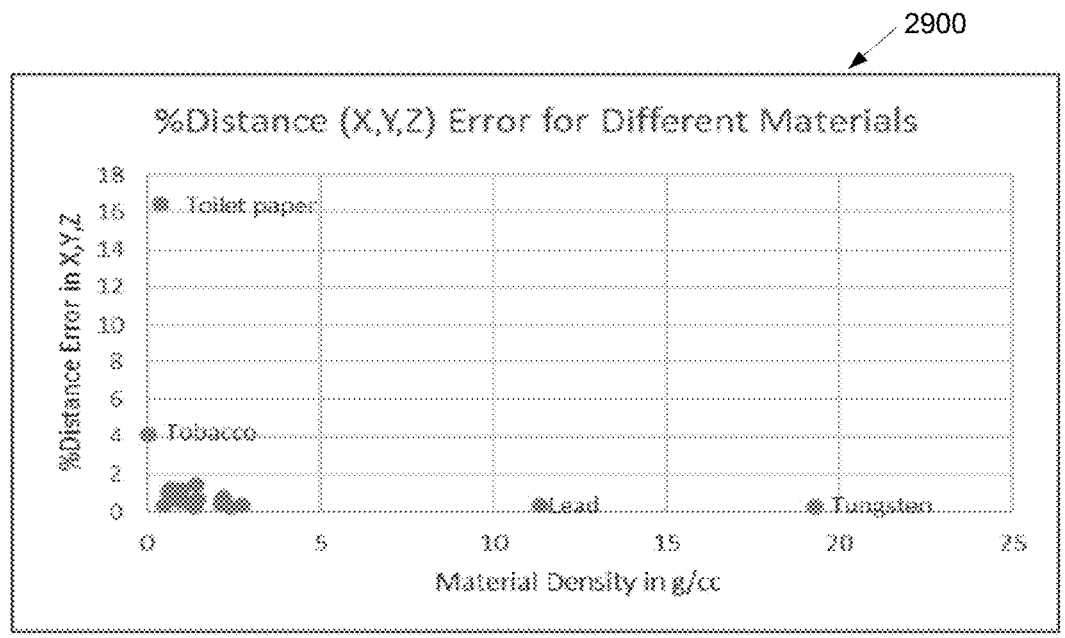
FIG. 29 is a plot showing error in location of object volume found automatically with respect to manual.

The first plot 2700 in FIG. 27 shows the percentage error in detection of the XY location of the object. The error in location in XY are found automatically with respect to manual inspection. FIG. 28 is a plot 2800 showing % error in location in Z (thickness) found automatically with respect to manual inspection. FIG. 29 is a plot 2900 showing error in location of object volume found automatically with respect to manual. Specifically, FIG. 29 shows the percentage location error in XYZ. In the plot, toilet paper is hard to segment in this timeframe due to low contrast. The other objects have low errors. The errors in XY and Z are shown separately as well. In the XY direction the errors are quite small but in the case of the Z estimation the errors are much larger. This is likely due to shadowing effects due to limited angle reconstruction. We are working on techniques to improve the results.

The thickness is used separately sometimes for other unique signatures. The combined X, Y, Z volume location error is shown in the plot below. Toilet paper is difficult to segment and results in larger errors but tobacco is reasonable and the rest of the materials are very close with less than 2%.

Figure 30:
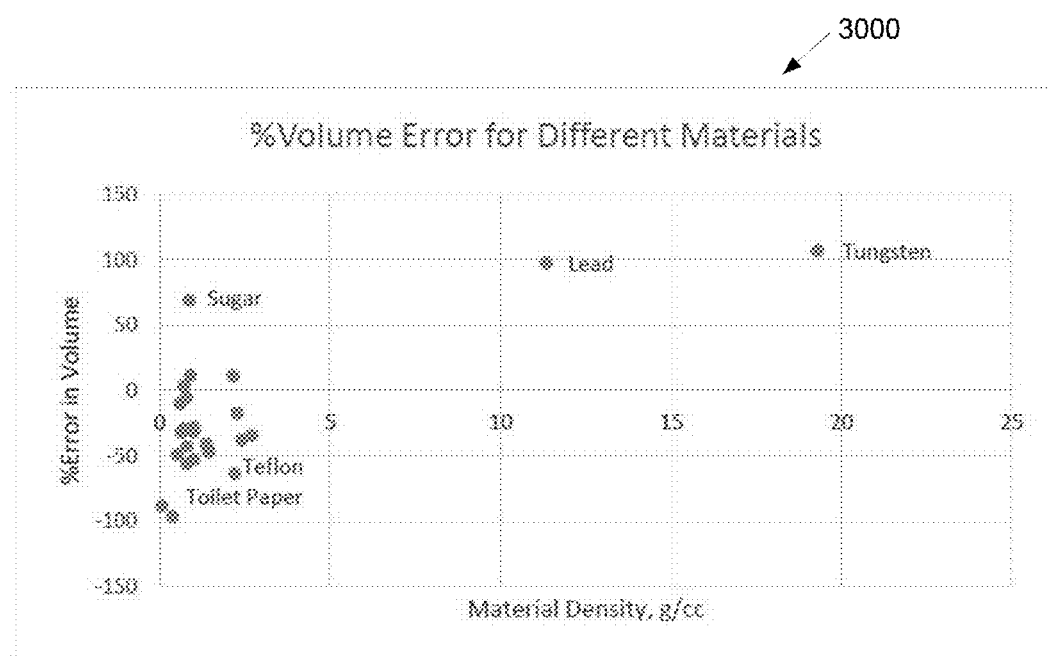
FIG. 30 shows performance for volume including error in location of object volume found automatically with respect to actual.
Figure 31:
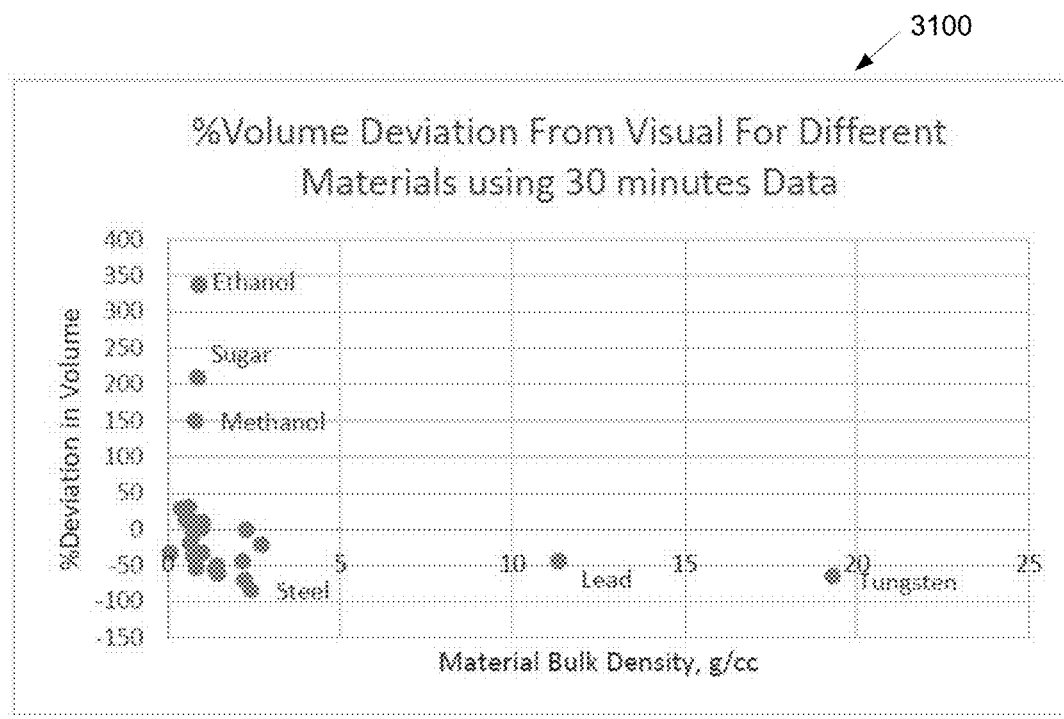
FIG. 31 shows an exemplary volume variation results.

The plot 3000 in FIG. 30 shows performance for volume. The computed volume from segmentation were compared against the actual volume. Specifically, FIG. 30 shows error in location of object volume found automatically with respect to actual. These errors are higher due to reasons explained below. The volume variation results are shown in plot 3100 of FIG. 31.

One major reason for the over or under segmentation is due to the effects of shadowing in the volume reconstruction using limited angles. Highly dense materials such as tungsten lead are calculated much higher than actual due to loss of resolution in the Z axis due to larger shadowing effect. Materials such as toilet paper and tobacco show up lower in volume than actual due to its lower density and higher penetration of charged particles. One approach is to utilize side tracks to reduce effects due to shadowing. For faster analysis, we have limited the resolution to larger voxels than the system is capable of and so it shows a larger error than actual.

The over or under estimation of the volume itself may not be the final determining factor in classification but the location of the object and its properties might be. These may determine its identification.

There are other ways to reduce the error as well. We can increase the resolution which will allow more accurate isolation of the volume of the object. There are also corrections to the thickness measurements based on geometry and architecture of the detector structure that are possible.

While various examples and implementations of the disclosed object detection and feature extraction techniques are described in the context of the reconstructed muon images, these disclosed techniques are also applicable to analyzing reconstructed cosmic-ray electron images and other reconstructed charged particle images obtained from other types of cosmic-ray tomography systems. Moreover, the disclosed techniques are also applicable to analyzing reconstructed active electron (i.e., using active electron sources) scanning images or active proton (i.e., using active proton sources) scanning images, and other charged particle scanning images obtained from other types of active charged particle tomography systems. Hence, the disclosed techniques are not limited to analyzing reconstructed muon images.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendices.

What is claimed is:

1. A method for analyzing a reconstructed charged particle image of a volume from charged particle detector measurements to detect objects within the volume, the method comprising:
   partitioning the reconstructed charged particle image of the volume into a set of voxels wherein each voxel is associated with an intensity value;
   identifying a subset of the set of voxels as object-candidate voxels for generating objects by performing a segmentation operation on the reconstructed charged particle image of the volume;
   identifying one or more objects within the reconstructed charged particle image of the volume by performing a connected-component analysis on the object-candidate voxels; and
   extracting a set of object features for each identified object,
   wherein the set of object features include an energy metric which is the sum of the product of: (a) the difference between the intensity value of a given voxel and the intensity value of a voxel at the center of mass of a given object and (b) the distance of the given voxel from the center of mass of the given object.

2. The method of claim 1, wherein the intensity value of each voxel is based at least partly on the charged particle detector measurements which include both scattering and stopping of charged particles inside the voxel.

3. The method of claim 1, comprising:
   prior to the partitioning the reconstructed charged particle image of the volume, preprocessing the reconstructed charged particle image to enhance the reconstructed charged particle image.

4. The method of claim 3, wherein the preprocessing the reconstructed charged particle image to enhance the reconstructed charged particle image includes performing a gradient smoothing technique on the reconstructed charged particle image.

5. The method of claim 1, wherein performing the segmentation operation to identify the subset of the set of voxels as object-candidate voxels includes using a high threshold and a low threshold to label each voxel as either an object-candidate voxel or a non-object voxel.

6. The method of claim 5, wherein using the high threshold and the low threshold to label each voxel as either an object-candidate voxel or a non-object voxel includes:
   identifying a given voxel in the set of voxels that is associated with an intensity value either below the low threshold or above the high threshold as a non-object voxel by labeling with a first binary value; and
   identifying a given voxel in the set of voxels that is associated with an intensity value between the low threshold and the high threshold as an object-candidate voxel by labeling with a second binary value opposite to the first binary value.

7. The method of claim 6, wherein performing the segmentation operation on the reconstructed charged particle image includes generating a binary image of binary-valued voxels, wherein the object-candidate voxels are labeled with the same second binary value.

8. The method of claim 7, comprising:
   prior to performing the connected-component analysis on the indicated object-candidate voxels, performing a binary morphological operation on the binary image to improve connectedness of the binary-valued voxels.

9. The method of claim 8, wherein the binary morphological operation improves connectedness of the binary-valued voxels by reversing the associated binary value of a given non-object voxel to change the given non-object voxel into an object-candidate voxel when the given non-object voxel is surrounded by object-candidate voxels.

10. The method of claim 8, wherein performing the binary morphological operation on the binary image includes applying a sequence of morphological dilation operations and a sequence of morphological erosion operations to the binary-valued voxels.

11. The method of claim 8, wherein performing the binary morphological operation on the binary image includes using a structuring element or kernel on the binary image to ensure the connectedness of a given voxel to adjacent voxels when criteria for the structural element or kernel is satisfied by the given voxel.

12. The method of claim 11, wherein the structuring element or kernel is in the shape of a sphere or a cube.

13. The method of claim 1, wherein prior to performing the segmentation operation, the method further comprises performing one of the following grayscale morphological operations on the intensity image:
   a grayscale morphological close operation;
   a grayscale morphological open operation; or
   a combination of the grayscale morphological close operation and the grayscale morphological open operation.

14. The method of claim 1, wherein performing the segmentation operation to identify the subset of the set of voxels as candidate voxels includes using multiple sets of a high threshold and a low threshold to label each voxel as either an object-candidate voxel or a non-object voxel, wherein using multiple sets of high and low thresholds increase the number of object-candidate voxels that can form objects.

15. The method of claim 14, wherein each set of the high and low thresholds is computed adaptively based on the volume being analyzed.

16. The method of claim 7, wherein performing the connected-component analysis on the object-candidate voxels to identify one or more objects includes:
identifying a cluster of binary-valued voxels which are connected to each other; and
labeling the cluster of connected binary-valued voxels with a common identifier to identify a unique object.

17. The method of claim 1, wherein while performing the connected-component analysis on the object-candidate voxels to identify a potential object, when a voxel is found to be not connected to the potential object but satisfy criteria for the connectivity type of the potential object, labeling the voxel as a voxel of the potential object.

18. The method of claim 17, wherein the criteria include both full connectedness and partial connectedness.

19. The method of claim 1, includes:
after identifying the one or more objects within the reconstructed charged particle image of the volume, performing feature extraction operations on an identified object based at least on the associated intensity values of the set of voxels that form the identified object to obtain a set of features of the identified object.

20. The method of claim 19, includes;
prior to performing the feature extraction operations, partitioning an identified object into a set of smaller objects using a cluster operation.

21. The method of claim 19, includes:
after obtaining the set of features of the identified object, classifying the identified object into categories based on the set of features for material identification.

22. The method of claim 1, wherein the volume includes a package, a cargo, a container, or an empty or occupied vehicle.

23. The method of claim 1, wherein the charged particle images include:
a cosmic-ray muon image;
a cosmic-ray electron image; or
a combined cosmic-ray muon and cosmic-ray electron image.

24. A method for analyzing a reconstructed charged particle image of a volume from charged particle detector measurements to detect objects within the volume, the method comprising:
partitioning the reconstructed charged particle image of the volume into a set of voxels wherein each voxel is associated with an intensity value;
identifying a subset of the set of voxels as object-candidate voxels for generating objects by performing a segmentation operation on the reconstructed charged particle image of the volume;
identifying one or more objects within the reconstructed charged particle image of the volume by performing a Blob detection operation on the object-candidate voxels; and
extracting a set of object features from each identified object based at least on statistical and geometric properties of the identified object, wherein the set of object features includes an energy metric which is the sum of the product of: (a) the difference between the intensity value of a given voxel and the intensity value of a voxel at the center of mass of the identified object and (b) the distance of the given voxel from the center of mass of the identified object.

25. The method of claim 24, wherein performing the Blob detection operation on the object-candidate voxels to identify one or more objects includes identifying regions of voxels having similar properties.

26. The method of claim 24, wherein performing the segmentation operation to identify the subset of the set of voxels as object-candidate voxels includes using a high threshold and a low threshold to label each voxel as either an object-candidate voxel or a non-object voxel.

27. The method of claim 26, wherein using the high threshold and the low threshold to label each voxel as either an object-candidate voxel or a non-object voxel includes:
identifying a given voxel in the set of voxels that is associated with an intensity value either below the low threshold or above the high threshold as a non-object voxel by labeling with a first binary value; and
identifying a given voxel in the set of voxels that is associated with an intensity value between the low threshold and the high threshold as an object-candidate voxel by labeling with a second binary value opposite to the first binary value.

28. The method of claim 26, wherein performing the segmentation operation to identify the subset of the set of voxels as candidate voxels involves using multiple sets of a high threshold and a low threshold to label each voxel as either an object-candidate voxel or a non-object voxel, wherein using multiple sets of high and low thresholds increase the number of object-candidate voxels that can form objects.

29. The method of claim 28, wherein each set of the high and low thresholds is computed adaptively based on the volume being analyzed.

30. The method of claim 24, wherein the charged particle images include:
a cosmic-ray muon image;
a cosmic-ray electron image; or
a combined cosmic-ray muon and cosmic-ray electron image.

31. A method for extracting features from objects identified within a reconstructed charged particle image of a volume from charged particle detector measurements, the method comprising:
partitioning the reconstructed charged particle image of the volume into a set of voxels wherein each voxel is associated with an intensity value;
identifying a subset of the set of voxels as object-candidate voxels for generating objects by performing a segmentation operation on the reconstructed charged particle image of the volume;
identifying one or more objects within the reconstructed charged particle image of the volume by performing a connected-component analysis on the object-candidate voxels; and
extracting a set of object features from each identified object based at least on statistical and geometric properties of the identified object, wherein the set of object features includes an energy metric which is the sum of the product of: (a) the difference between the intensity value of a given voxel and the intensity value of a voxel at the center of mass of the object and (b) the distance of the given voxel from the center of mass of the identified object.

32. The method of claim 31, wherein the set of object features includes a volume of the identified object.

33. The method of claim 31, wherein the set of object features includes an average intensity of the set of voxels occupying the identified object.

34. The method of claim 31, wherein the set of object features includes a variance of the intensities associated with the set of voxels occupying the identified object.

35. The method of claim 31, wherein a subset of the set of object features are computed based on both the voxel intensity values and a set of charged particle tracks related parameters.

36. The method of claim 31, wherein a subset of the set of object features are computed based on the spatial connections of the voxels in the identified object, voxel intensity values and a set of charged particle tracks related parameters.

37. The method of claim 36, wherein the set of charged particle tracks related parameters includes at least one of:
   distance of closest approach (DoCA) values;
   point of closest approach (PoCA) values;
   charged particle flux values; or
   SumLogPTheta values computed as $\Sigma_{i=1}^{N} \ln(p \times \theta)_i$, wherein $\theta$ is the scattering angle of the ith charged particle and p is the momentum of the ith charged particle.

38. The method of claim 31, wherein the energy metric is computed as:

$$\text{Energy} = \Sigma_{i=1}^{N}((I_i - I_c)^2 * \sqrt{(x_c - x_i)^2 + (y_c - y_i)^2 + (z_c - z_i)^2}),$$

wherein N is the count of all the voxels in the identified object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

39. The method of claim 31, wherein the set of object features includes an entropy metric which measures an uncertainty in the identified object, wherein the entropy metric is computed as:

$$\text{Entropy} = \Sigma_{i=1}^{N}(P_i * \log_2 P_i),$$

wherein $P_i$ is the probability density function of the ith voxel.

40. The method of claim 39, wherein the probability density function $P_i$ is computed based at least on the histograms of the intensity values of voxels in the identified object, wherein $P_i$ is given by:

$$P_i = H_i / \Sigma_{k=1}^{N} H_k,$$

and wherein $H_i$ is the histogram of the intensity value of the ith voxel and $H_k$ is the histogram of the intensity value of the kth voxel.

41. The method of claim 31, wherein the charged particle images include:
   a cosmic-ray muon image;
   a cosmic-ray electron image; or
   a combined cosmic-ray muon and cosmic-ray electron image.

42. A system for analyzing a reconstructed charged particle image of a volume from charged particle detector measurements to detect objects within the volume, comprising:
   a processor;
   a memory; and
   an image processing mechanism coupled to the processor and the memory, wherein the image processing mechanism is configured to:
      partition the reconstructed charged particle image of the volume into a set of voxels wherein each voxel is associated with an intensity value;
      identify a subset of the set of voxels as object-candidate voxels for generating objects by performing a segmentation operation on the reconstructed charged particle image of the volume;
      identify one or more objects within the reconstructed charged particle image of the volume by performing a connected-component analysis on the object-candidate voxels; and
      extracting a set of object features for each identified object, wherein the set of object features include an energy metric which is the SUM of the product of:
         (a) the difference between the intensity value of a given voxel and the intensity value of a voxel at the center of mass of a given object and (b) the distance of the given voxel from the center of mass of the given object.

43. The system of claim 42, wherein the charged particle images include:
   a cosmic-ray muon image;
   a cosmic-ray electron image; or
   a combined cosmic-ray muon and cosmic-ray electron image.

44. A method for extracting features from objects identified within a reconstructed charged particle image of a volume from charged particle detector measurements, the method comprising:
   partitioning the reconstructed charged particle image of the volume into a set of voxels wherein each voxel is associated with an intensity value;
   identifying a subset of the set of voxels as object-candidate voxels for generating objects by performing a segmentation operation on the reconstructed charged particle image of the volume;
   identifying one or more objects within the reconstructed charged particle image of the volume by performing a connected-component analysis on the object-candidate voxels; and
   extracting a set of object features from each identified object based at least on statistical and geometric properties of the identified object, wherein the set of object features includes a SpikeEnergy metric which is the sum of the squares of the difference between the intensity value of a given voxel and the mean intensity value of all voxels in the identified object, wherein the intensity value of each voxel in the summation exceeds the mean intensity value for the identified object.

45. The method of claim 44, wherein the SpikeEnergy metric is computed as:

$$\text{SpikeEnergy} = \Sigma_{i=1}^{M}(I_i - \mu)^2, \text{ if } (I_i - \mu) > 0,$$

wherein $I_i$ is the intensity value of the ith voxel, and $\mu$ is the mean intensity value of all the voxels in the identified object.

* * * * *

UNITED STATES PATENT AND TRADEMARK OFFICE
CERTIFICATE OF CORRECTION

PATENT NO. : 10,042,079 B2
APPLICATION NO. : 14/706825
DATED : August 7, 2018
INVENTOR(S) : Rohit Patnaik Page 1 of 1

It is certified that error appears in the above-identified patent and that said Letters Patent is hereby corrected as shown below:

In the Claims

In Column 33, Line 36, in Claim 39, delete "Entropy=$\Sigma_{i=1}^{N}(P_i*\log_2 P_i)$," and insert -- $Entropy = -\sum_{i=1}^{N}(P_i * log_2 P_i)$. --, therefor.

In Column 34, Line 17, in Claim 42, delete "SUM" and insert --sum--, therefor.

Signed and Sealed this
Tenth Day of December, 2019

Andrei Iancu
*Director of the United States Patent and Trademark Office*